US007896192B2

(12) United States Patent
Conley et al.

(10) Patent No.: US 7,896,192 B2
(45) Date of Patent: Mar. 1, 2011

(54) PATIENT CONTROLLED TIMED MEDICATION DISPENSER

(75) Inventors: N. Sharon Conley, Ormond Beach, FL (US); Bernie Boydston, Palm Bay, FL (US); Rob Grillo, Rockledge, FL (US); Mike Keefe, Melbourne, FL (US); Ross Mayfield, Ormond Beach, FL (US)

(73) Assignee: Avancen MOD Corp., Mt. Pleasant, SC (US)

( * ) Notice: Subject to any disclaimer, the term of this patent is extended or adjusted under 35 U.S.C. 154(b) by 925 days.

(21) Appl. No.: 11/412,227

(22) Filed: Apr. 26, 2006

(65) Prior Publication Data

US 2008/0203107 A1 Aug. 28, 2008

Related U.S. Application Data

(63) Continuation-in-part of application No. 11/125,299, filed on May 9, 2005, now Pat. No. 7,743,923.

(51) Int. Cl.

| | |
|---|---|
| ***G01F 11/10*** | (2006.01) |
| ***B67D 5/10*** | (2006.01) |
| ***B65B 59/00*** | (2006.01) |
| ***B65D 83/04*** | (2006.01) |

(52) U.S. Cl. .............................. 221/15; 221/2; 221/69; 221/92

(58) Field of Classification Search ..................... 221/2, 221/3, 4, 5, 6, 7, 8, 9, 12, 14, 15, 10, 123, 221/129, 130, 132, 133, 151, 152, 153, 154, 221/155, 156, 162, 163, 167, 181, 203, 171, 221/213, 222, 223, 237, 258, 265, 275, 277; 206/538, 807

See application file for complete search history.

(56) References Cited

U.S. PATENT DOCUMENTS

| | | | | | |
|---|---|---|---|---|---|
| 2,913,581 | A | * | 11/1959 | Simonton et al. | 250/393 |
| 3,968,900 | A | * | 7/1976 | Stambuk | 221/3 |
| 4,047,635 | A | * | 9/1977 | Bennett, Jr. | 221/5 |
| 4,572,403 | A | * | 2/1986 | Benaroya | 221/3 |
| 4,662,537 | A | | 5/1987 | Wolf et al. | |
| 4,695,954 | A | | 9/1987 | Rose et al. | |
| 4,748,600 | A | * | 5/1988 | Urquhart | 368/10 |
| 4,785,969 | A | * | 11/1988 | McLaughlin | 221/2 |
| 4,811,764 | A | | 3/1989 | McLaughlin | |
| 4,838,453 | A | * | 6/1989 | Luckstead | 221/2 |
| 4,911,327 | A | | 3/1990 | Shepherd et al. | |
| 4,962,491 | A | | 10/1990 | Schaeffer | |
| 5,246,136 | A | * | 9/1993 | Loidl | 221/3 |
| 5,322,166 | A | * | 6/1994 | Crowther | 206/538 |
| 5,323,929 | A | | 6/1994 | Marlar | |

(Continued)

*Primary Examiner*—Gene Crawford
*Assistant Examiner*—Kelvin L Randall, Jr.
(74) *Attorney, Agent, or Firm*—John L. DeAngelis; Beusse Walter Sanks Mora & Maire, P.A.

(57) ABSTRACT

A medication on demand dispenser. The dispenser provides patient access to medications prescribed to be available on an as-needed basis but with a prescribed minimum time interval between doses. The dispenser permits access to a single medication dose after each minimum time interval has elapsed. After a drug dose is presented to the patient, the dispenser prevents access to the next dose until the minimum time interval has elapsed.

28 Claims, 17 Drawing Sheets

U.S. PATENT DOCUMENTS

| | | | | | |
|---|---|---|---|---|---|
| 5,372,276 | A | | 12/1994 | Daneshvar | |
| 5,392,952 | A | * | 2/1995 | Bowden | 221/15 |
| 5,397,017 | A | * | 3/1995 | Muza et al. | 221/91 |
| 5,441,165 | A | | 8/1995 | Kemp et al. | |
| 5,472,113 | A | * | 12/1995 | Shaw | 221/7 |
| 5,522,525 | A | * | 6/1996 | McLaughlin et al. | 221/4 |
| 5,564,593 | A | | 10/1996 | East, Sr. | |
| 5,582,323 | A | | 12/1996 | Kurtenbach | |
| 5,603,429 | A | * | 2/1997 | Mulhauser et al. | 221/171 |
| 5,609,268 | A | | 3/1997 | Shaw | |
| 5,612,869 | A | * | 3/1997 | Letzt et al. | 705/3 |
| 5,751,661 | A | * | 5/1998 | Walters | 368/10 |
| 5,755,357 | A | | 5/1998 | Orkin et al. | |
| 5,826,217 | A | * | 10/1998 | Lerner | 702/177 |
| 5,850,937 | A | | 12/1998 | Rauche | |
| 5,954,225 | A | * | 9/1999 | Powe | 221/2 |
| 6,021,918 | A | * | 2/2000 | Dumont et al. | 221/2 |
| 6,138,865 | A | | 10/2000 | Gilmore | |
| 6,145,697 | A | * | 11/2000 | Gudish | 221/3 |
| 6,163,736 | A | | 12/2000 | Halfacre | |
| 6,194,995 | B1 | | 2/2001 | Gates | |
| 6,216,910 | B1 | | 4/2001 | Numerick | |
| 6,219,587 | B1 | | 4/2001 | Ahlin et al. | |
| 6,221,010 | B1 | | 4/2001 | Lucas | |
| 6,231,560 | B1 | | 5/2001 | Bui | |
| 6,234,343 | B1 | | 5/2001 | Papp | |
| 6,304,797 | B1 | * | 10/2001 | Shusterman | 700/243 |
| 6,330,957 | B1 | | 12/2001 | Bell-Greenstreet | |
| 6,346,886 | B1 | * | 2/2002 | De La Huerga | 340/573.1 |
| 6,415,202 | B1 | * | 7/2002 | Halfacre | 700/232 |
| 6,427,865 | B1 | * | 8/2002 | Stillwell et al. | 221/4 |
| 6,439,422 | B1 | | 8/2002 | Papp et al. | |
| 6,471,087 | B1 | * | 10/2002 | Shusterman | 221/2 |
| 6,507,275 | B2 | | 1/2003 | Romano et al. | |
| 6,510,962 | B1 | * | 1/2003 | Lim | 221/15 |
| 6,529,446 | B1 | * | 3/2003 | de la Huerga | 368/10 |
| 6,574,165 | B2 | * | 6/2003 | Sharma et al. | 368/10 |
| 6,601,729 | B1 | | 8/2003 | Papp | |
| 6,662,081 | B1 | | 12/2003 | Jacober et al. | |
| 6,766,219 | B1 | | 7/2004 | Hasey | |
| 7,347,341 | B2 | * | 3/2008 | Burggraf | 221/3 |
| 2002/0118604 | A1 | * | 8/2002 | Sharma et al. | 368/10 |
| 2003/0019879 | A1 | | 1/2003 | Hubicki | |
| 2003/0127463 | A1 | | 7/2003 | Varis | |
| 2003/0197013 | A1 | | 10/2003 | Conti | |
| 2004/0104652 | A1 | | 6/2004 | Holmes | |

* cited by examiner

PATIENT CONTROLLED TIMED MEDICATION DISPENSER

CROSS-REFERENCE TO RELATED APPLICATIONS

This patent application is a continuation-in-part application claiming the benefit of the patent application assigned Ser. No. 11/125,299, filed on May 9, 2005 now U.S. Pat. No. 7,743,923, which claims the benefit of the patent application Ser. No. 10/247,427, filed on Sep. 19, 2002, now U.S. Pat. No. 7,044,302, which claims the benefit of the provisional patent application assigned Ser. No. 60/323,521 filed on Sep. 19, 2001.

Certain claimed elements of the present invention were developed with funds provided by the U.S. National Institutes of Health under grant number IR43NS046087-01A1. The U.S. government therefore has certain rights in these elements of the invention.

FIELD OF THE INVENTION

The present invention relates generally to a medication dispenser, and more particularly to a time-controlled medication dispenser for dispensing as-needed medications.

BACKGROUND OF THE INVENTION

Fifty percent of post-operative patients report inadequate pain relief. Fifty percent of all cancer patients and ninety percent of advanced cancer patients experience pain. Pain is now defined as "the fifth vital sign" as part of the mandate by the Joint Commission on Accreditation of Healthcare Organizations (JCAHO) to develop guidelines for pain management.

Adequate pain control requires the appropriate medication for the pain level and type reported. In a hospital setting, pain medication can be obtained only by a physician's order. Pain medications such as narcotics and nonsteroidals (and anxiety medications such as tranquilizers) are frequently ordered on an as-needed basis (referred to as prn orders). This approach requires the patient to initiate a request for each pm drug dose. The nurse determines whether the appropriate time interval has passed between doses, according to the physician's order. If the required time interval has elapsed, the nurse transports the medication to the patient's bedside and administers the medication to the patient. In some dosing regimens the patient is given a time-release pain medication at the same time(s) each day, with as-needed (prn) medications for breakthrough pain. Again the patient must request the medication for each breakthrough pain episode. A common reported patient frustration is the need to issue a request for each and every dose of prn medication. Thus a busy nurse must determine that the ordered time has elapsed from the last dosage, locate the medication and transport it to the patient in response to each request. This must also be accomplished in a timely fashion, as patients in pain must be administered to as soon as possible.

The as-needed approach to dosing provides the minimum amount of medication to adequately control symptoms, without the risk of abuse, overdosing and unnecessary side effects. Disadvantageously, in a hospital or institutional setting each medication that is dispensed on a prn basis requires nursing staff time and extra documentation by nursing and pharmacy staff, since the drugs can be administered only after the lapse of the predetermined time interval between doses. For example, a drug prescribed as needed every six hours may be given no more than four times in 24 hours. Such a drug may be administered from zero to four times in any given 24-hour period, depending upon patient dosage requests. If six hours have passed since the last administration of the drug, the medication is provided to the patient in response to the request. If six hours have not lapsed, the patient must wait the minimum time interval of six hours prior to receiving the next drug dose. In a home setting, the patient must remain aware of the restricted dosing schedule to safely self-administer these medications.

An automated bedside dispensing cabinet, requiring the nurse to enter the cabinet at times to dispense medications, is known. As with all prn medications this device requires the nurse to visit the patient's room, where the medication is removed from the cabinet for dispensing. Although such a device reduces medication errors compared to the conventional approach, it expends valuable nursing time and expense.

It is also known that oral medications may be provided through the use of a sealed wrist pouch. The pouch is worn by the patient and filled with two medication doses. The pouch is refilled by a nurse at the patient's request. The patient reports the time of each self-administered dose and maintains a pain control diary. As in the other prior art devices, nursing staff time is required for refills and nursing staff availability may disrupt timely refilling of the pouch.

Drug delivery devices that remind the patient to take a medication at preset time intervals are known. These devices provide the reminder through a variety of signaling indicators, such as audible alarms, and promote compliance to a scheduled dosing regimen, but do not control nor prevent patient access to the medications at intervals shorter than prescribed.

Known PCA (patient controlled analgesia) intravenous pumps allow patients to self-medicate with pain medications. Using a PCA pump, under a physician's order, a patient receives a single dose of intravenous medication by activating a bedside button. The actuation starts a pump that delivers a measured dose of the intravenous drug (a narcotic, for example) at allowable time intervals. If the button is activated during a time interval in which an allowable dose has already been administered, the pump is "locked out" and unable to deliver the dose until the appropriate time interval has passed. This prevents the patient from taking more than a maximum allowable dose of medication during a measured time interval. The PCA device records the drug volume delivered over time. A nurse can query the device to chart the volume of drug delivered over a given time interval and the number of doses administered.

Two other dosing devices are available using the same principal as the intravenous PCA. These include pumps that deliver narcotic medications subcutaneously and epidural catheters that deliver pain medications near the spinal canal. Cancer patients experiencing both acute and chronic pain use such intravenous PCA pumps.

A randomized study of pain management in a post-operative setting using patient controlled analgesia (that is, the PCA pump) versus conventional pain therapy CPT (i.e., a request to the nurse for each administered dose), has been reported in the medical literature. Patient satisfaction for pain management in the PCA group was significantly better than that reported in the CPT group. Note the only difference between the two study groups was the ability of the PCA group to easily and promptly self-control the medication dosing.

Multiple factors prevent the timely dosing of pain medication and other as-needed medications to the patient bedside according to conventional pain therapy techniques. A national survey of pharmacy practice in acute care settings in 1999 indicated that 75% of pharmacies still practice centralized pharmacy distribution systems. In some situations, these centralized pharmacies extend the time required to deliver medications to each patient area. A future medication-delivery trend includes automated medication dispensing stations in each patient area. Although this is a trend for the future, it is not as yet reality except in large, sophisticated, primarily academic hospitals. Currently there is a shortage of pharmacists and the existing staffs are over-burdened, creating further delays in drug delivery to the patient bedside.

In about 98% of the cases, nurses directly administer medications to patients. A time and motion study has reported that each prn oral medication delivered by a nurse to a hospital patient requires 18.42 minutes, which includes the unlocking of the narcotics cabinet to sign out the medication, transporting it to the patient's bedside, and documenting (charting) the time the dose is given. Like the pharmacy staff, nursing staffs are short-handed, while the number of complex hospitalized patients is growing. These patients have increasingly more complex diagnoses with more medication requirements.

Improved patient pain control leads to better patient outcomes in the hospital setting. This has been well documented in the surgical literature in the post-operative setting, with fewer post-operative complications, earlier rehabilitation, and shorter hospital stays for patients with better pain management. Better pain management is also highly cost effective since earlier discharges and fewer complications save health care dollars and staff time.

BRIEF SUMMARY OF THE INVENTION

According to one embodiment, the present invention comprises a medication dispenser for permitting access to medication doses after a minimum dosing interval between doses. The dispenser comprises a medication tray comprising medication retention areas, wherein a medication dose is disposed in each retention area and further comprising blank areas; a cover disposed over the medication tray, the cover defining a dose opening therein through which a dose in a retention area can be accessed; a controller for authenticating a person to access a medication dose, the controller further aligning the dose opening with a retention area to present a medication dose through the dose opening after the minimum dosing interval has elapsed and the person has been authenticated, and wherein the controller aligns the dose opening with a blank area between minimum dosing intervals.

According to another embodiment, the present invention comprises a medication dispenser for providing medication doses for administration to a patient with a minimum dosing interval between successive doses. The medication dispenser comprises a substantially circular medication tray comprising medication retention areas and blank regions about a periphery thereof; an enclosure for supporting the medication tray, wherein the enclosure defines an opening, and wherein the medication doses are accessed through the opening; a controller for controlling a relative position of the medication tray and the opening to align one of the medication retention areas with the opening responsive to authentication of a person to access the medication dose and after the minimum dosing interval from an immediately previous presentation of one of the medication doses and wherein after a time when the opening is aligned with one of the medication retention areas the controller aligns a blank region with the opening.

According to yet another embodiment, the present invention comprises a medication dispenser for providing medication doses for administration to a patient. The dispenser comprises a medication tray carrying a plurality of medication doses to be administered on an as needed basis with a minimum dosing interval between each dose; a housing supporting the medication tray; a controlled-access opening within the housing for providing access to one of the plurality of medication doses, wherein the controlled access opening is controllable to a dose-accessible condition permitting access to the medication does therethrough and a controller for controlling the controlled-access opening to allow withdrawal of the medication dose therethrough responsive to the minimum dosing interval and further responsive to authentication of the patient.

According to another embodiment, the present invention comprises a medication dispenser for providing medication doses for administration to a patient with a minimum dosing interval between successive doses. The medication dispenser comprises a housing having an opening therein; a medication tray received within the opening and comprising medication retention areas, wherein a medication dose is disposed in one or more of the retention areas, and further comprising blank regions between the medication retention areas; a cover lockably disposed to close the opening; a lock in the housing locking the cover within the opening, wherein in an unlocked condition the cover is removable from the opening; a controller for authenticating a patient and the controller further controlling the medication tray to align one of the plurality of retention areas containing a medication dose with the opening after the minimum dosing interval has elapsed, thereby making the medication dose available to an authenticated patient.

According to another embodiment, the invention comprises a method for dispensing a medication dose from a medication dispenser to a patient. The method comprises (a) determining that a minimum dosing interval has elapsed, (b) indicating to a user that the minimum dosing interval has elapsed, (c) authenticating the user, and responsive to the steps (a) and (c) causing a medication-containing medication retention area of the medication dispenser to align with an opening in the medication dispenser, allowing the authenticated user to remove the medication dose from the retention area through the opening.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The figures are not necessarily to scale, emphasis instead being placed upon illustrating the principles of the invention.

DETAILED DESCRIPTION OF THE INVENTION

Figure 1:
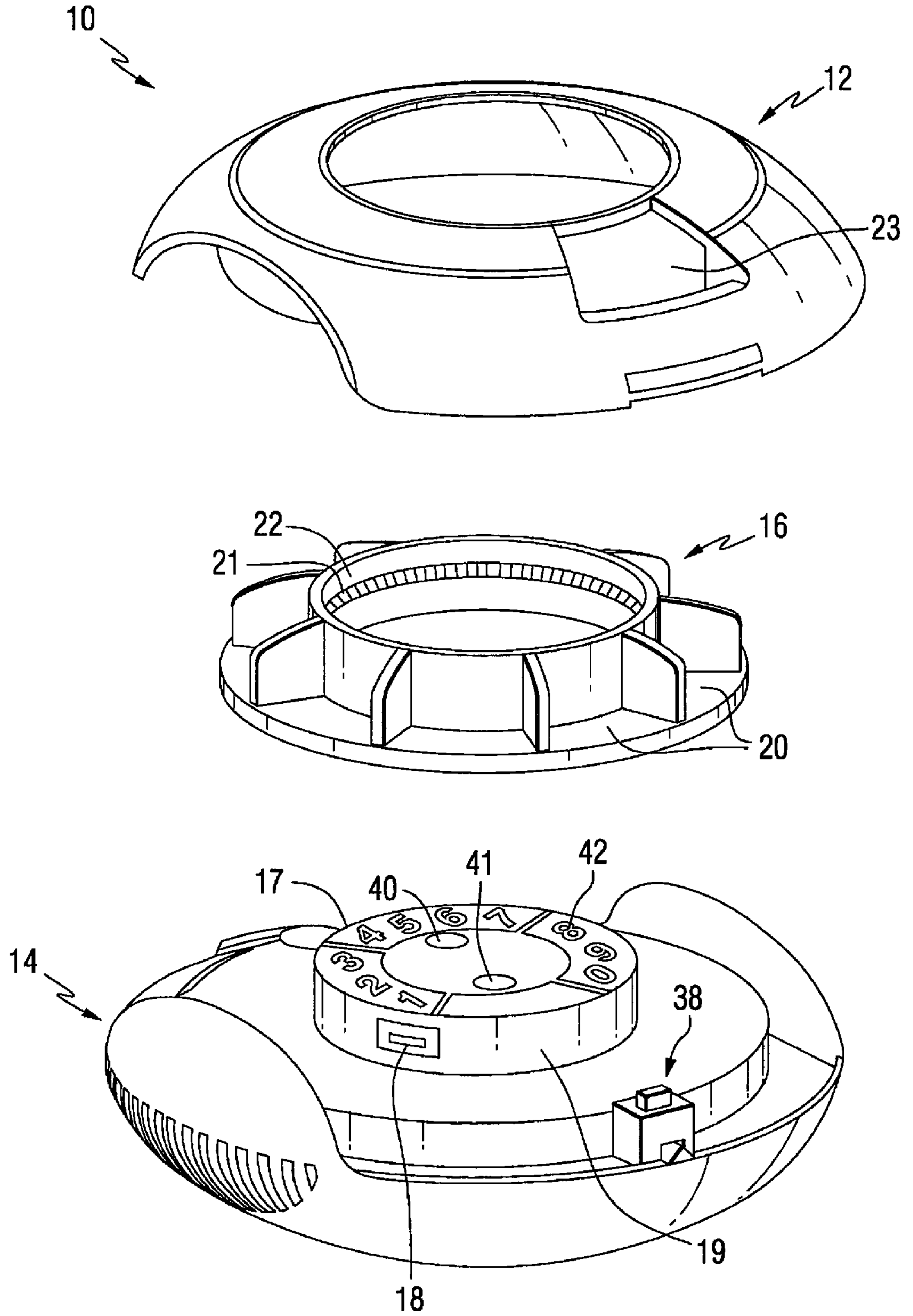
FIG. 1 is an exploded view of a medication on demand device constructed according to the teachings of the present invention.

Before describing in detail the particular medication dispenser in accordance with the present invention, it should be observed that the present invention resides primarily in a novel combination of hardware and software elements related to a medication dispenser. Accordingly, the elements have been represented by conventional elements in the drawings, showing only those specific details that are pertinent to the present invention, so as not to obscure the disclosure with structural details that will be readily apparent to those skilled in the art having the benefit of the description herein.

A medication on demand device 10 constructed according to the teachings of the present invention is illustrated in the exploded view of FIG. 1, comprising an upper assembly 12 for mating with a lower assembly 14 and capturing a medication tray 16 there between. The medication tray 16 is received by an upper surface enclosure 17 of the lower assembly 14. In one embodiment a motor (not shown in FIG. 1) is located within the upper surface enclosure 17. A gear 18 attached to a motor shaft protrudes from the vertical surface 19 of the upper surface enclosure 17 for drivingly mating with a circumferential gear track 21 disposed on an inner surface 22 of the medication tray 16. Thus rotation of the gear in response to the application of electricity to the motor causes rotation of the medication tray 16.

The upper assembly 12 includes a passage 23 for receiving a door (not shown in FIG. 1) providing access to one of a plurality of medication retention areas 20 of the medication tray 16. Once the patient has opened and closed the door to remove the medication, a timing sequence is initiated and during that sequence the medication tray 16 is locked in place. After the dosing interval has elapsed, the medication tray 16 is rotated, through action of the motor and associated gearing, through an arc segment to align the passage 23 with the next one of the plurality of medication retention areas 20. As described further below, the medication tray 16 is controllably rotated after a predetermined time interval has elapsed since the last dosage and responsive to entry of a patient code on a keypad of the device 10. The patient can then remove the next dosage for self-administration.

In the embodiment of FIG. 1 each one of the plurality of equally-sized medication retention areas 20 carries a medication dose for administration to the patient. Preferably, the upper assembly 12 is translucent or transparent and the lower assembly 14 is opaque to provide a color contrast, making the medication dose easily visible within the plurality of medication retention areas 20. In another embodiment a color-coded medication tray serves as an indicator of the drug type carried there within. In the pharmacy, the medication tray 16 can be loaded with medications, labeled to identify the patient and the minimum-dosing interval, and provided to the patient's attendant. While being transported, the medication tray 16 can be covered with a disposable cover.

A controller 30 (see FIG. 2) and its associated components control rotation of the medication tray 16 and allow patient access to the medications. In one embodiment the controller 30 comprises a microchip-based controller (or a general purpose microprocessor) programmed to perform the various functions described herein. When the medication tray 16 is loaded into the device 10, the attendant or pharmacy staff enters the physician ordered dosing interval via an input device 34, comprising in one embodiment one or more manually operable switches. The controller 30 is responsive to the input device 34 for receiving and storing the dosing interval. The attendant also enters an authorization code, via the input device 34, that is stored in the controller 30, for later use to limit medication access only to the patient for whom the medications are intended.

The description herein generally refers to an attendant as the party exercising control over the operation of the device 10. This function can be performed by any third party controlling the patient's medication dosing, such as an in-home care giver, medical technician, pharmacy staff member, physician, family member, nurse, etc.

The controller 30 is further bi-directionally responsive to a timer 36 for monitoring the time interval between permitted doses, and to a door sensor 38 (see FIG. 1 for the physical location thereof) for determining the door position. From the door position information, the controller 30 determines the times when the door is opened and closed by the patient to receive the medication for self-administration. After the patient has sequenced the door through an open and close cycle to remove the medication dose, the controller 30 activates the timer 36 to begin a counting sequence representing the dosing interval. When the timer 36 times out, the dosing interval has elapsed and the patient is permitted to administer the next dose. In response thereto, the controller 30 illuminates an indicator 41 (see also FIG. 1) indicating that the dosing interval has elapsed. In one embodiment the indicator 41 (an unlocked indicator) comprises a light emitting diode. The embodiment illustrated in FIG. 1 includes a second optional indicator 40 (a locked indicator) that is illuminated during the time between permitted doses, serving as an indication that the patient is not permitted to administer the next medication dose.

Returning to FIG. 1, note that the upper surface enclosure 17 further carries a keypad 42 comprising a plurality of user-operable keys for entering an authorization code. After the indicator 41 is illuminated indicating that the next dose is available for administration, the patient uses the keypad 42 to enter a predetermined authorization code that is supplied as an input to the controller 30. In one embodiment, the code comprises four digits and is followed by entry of an "enter" command on the keypad 42. If the patient-entered code matches the stored authorized code (previously entered when the medication tray 16 was loaded into the device 10 as described above), in response thereto the controller 30 energizes a motor 44 to rotate the medication tray 16, as described above, such that the next medication retention area 20 is aligned with the passage 23. The patient now has access to the next medication dose. In one embodiment the motor 44 comprises a stepping motor that when energized controllably rotates only through a predetermined number of turns such that the next medication retention area 20 and the passage 23 are aligned.

The dosing timing cycle begins again when the door sensor 38 senses the opening and closing of the door, provides representative signals to the controller 30, and the controller 30 activates the timer 36.

If the patient's pain has subsided and he does not require a medication dose at the prescribed minimum interval, i.e., when the indicator 41 is illuminated the patient can elect not to enter the prescribed authorization code. The device 10 remains in a ready condition such that whenever the code is later entered the medication tray 16 is rotated and the next dose is accessible. Only an open and closing cycle of the door restarts the timing cycle.

The door open and close times determined as described above, are stored within the controller 30 and displayable on a clock 48 (disposed on the bottom surface of the lower assembly 14) in response to commands entered into the input device 34. For example, an attendant commands the controller 30 to control the clock 48 to display the dose administration times, (e.g., door open times) and enters the displayed times in the patient's chart.

In another embodiment the clock 48 is controllable to operate as a countdown clock for displaying the time remaining until the next permitted dose. The clock 48 is reset after each dose is administered. In still another embodiment, the clock 48 is operable as a real time clock in response to commands entered into the input device 34 by the attendant.

In another embodiment where patient records are stored in a computing mechanism and associated storage media, the controller 30 is connected via a wired or wireless network (e.g., a radio frequency communications link such as defined by an IEEE 802.11× standard or an infrared link) to the computing mechanism for automatically downloading the dose administration times and inputting them to the patient's record. The controller 30 can also be programmed for the permitted dosing interval, patient authorization code, authorized patient identification information, etc., through the wired (such as through a serial port included in the device 10) or the wireless network. This remote programming and querying feature avoids the need for a nurse to physically visit the location of the device 10 to execute the programming function. Instead programming of a plurality of devices 10 is performed from a central location via a wired or wireless network that allows each device 10 to be individually and uniquely accessed.

Although the timer 36 is described herein as a separate component of the controlling mechanism of the device 10, those skilled in the art recognize that the timing function can be incorporated within the controller 30. Likewise, storage of the dosing interval, authorization code, etc., is described with reference to on-board storage in an internal memory within the controller 30. In another embodiment the device 10 includes external memory responsive to the controller 30 for storing program code and such data.

Figure 2:
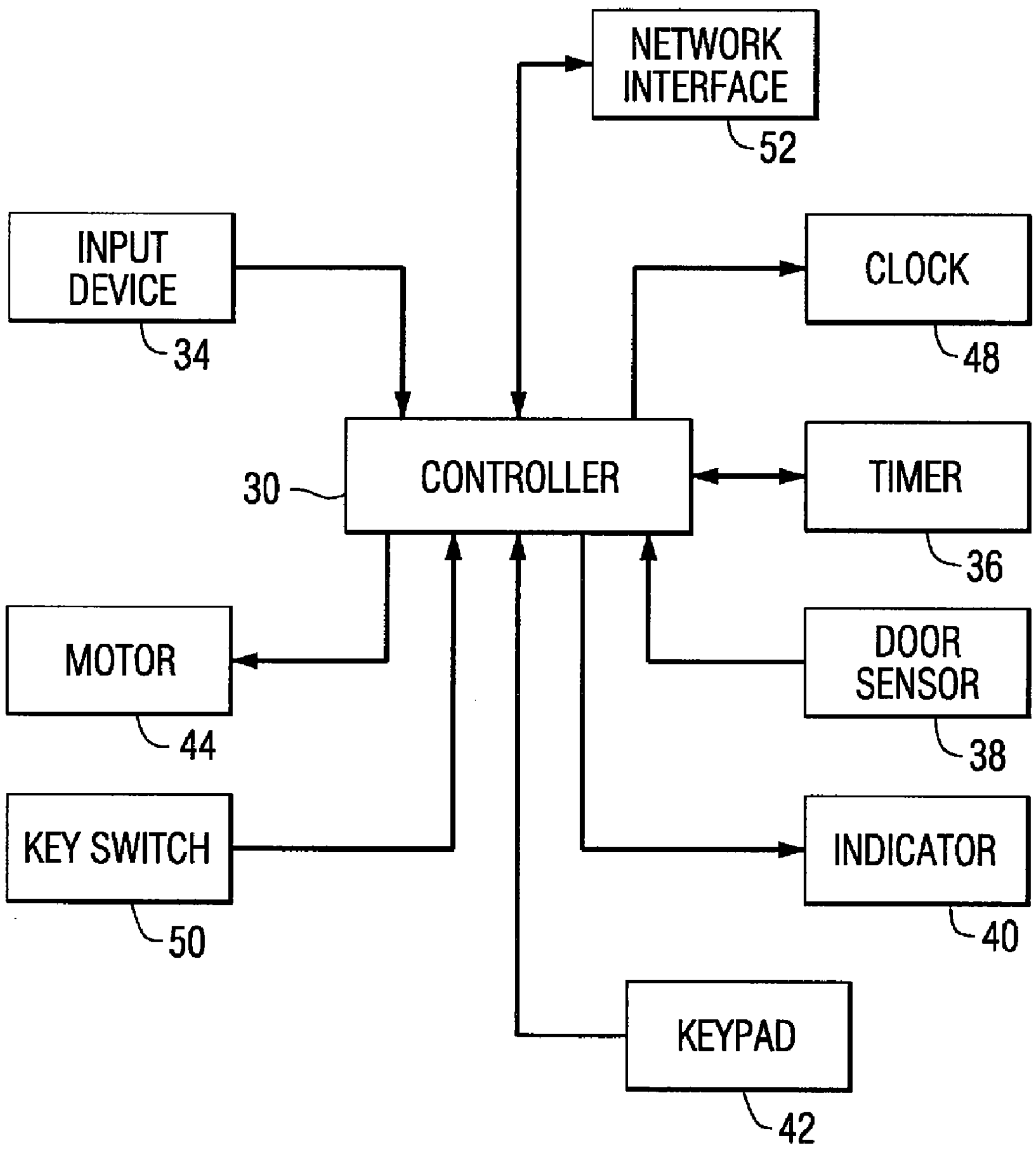
FIG. 2 is a block diagram of the control components of the medication on demand device of FIG. 1.

FIG. 2 further includes a key switch 50 for setting the operational mode for the device 10. In one embodiment the key switch 50 comprises a three-position key switch. A mating key is required to set the position of the key switch 50. Typically, this key is accessible only to the attendant. In a first position the upper and lower assemblies 12 and 14 are separable for loading a new medication tray 16. Typically, the device 10 is loaded with new medications doses every 24-hour period, although other time periods may apply depending on the dosing interval and the number of medication retention areas 20 within the medication tray 16. In a second position the device 10 is locked and ready for patient use. With the switch in the third key position the dosing interval, authorization code, etc., can be entered through the input device 34, and the controller 30 can be queried as to the times when the door 65 (see FIG. 3) was opened and closed.

FIG. 2 further includes a network interface 52 providing a wired or wireless connection to a remote computing device, such as a laptop or tablet computer or a personal digital assistant device. Information collected by the controller 30, such as patient's dosing times, is supplied to the remote computing device via the network interface 52. Additionally, the controller 30 can be programmed from the remote computing device.

Figure 3:
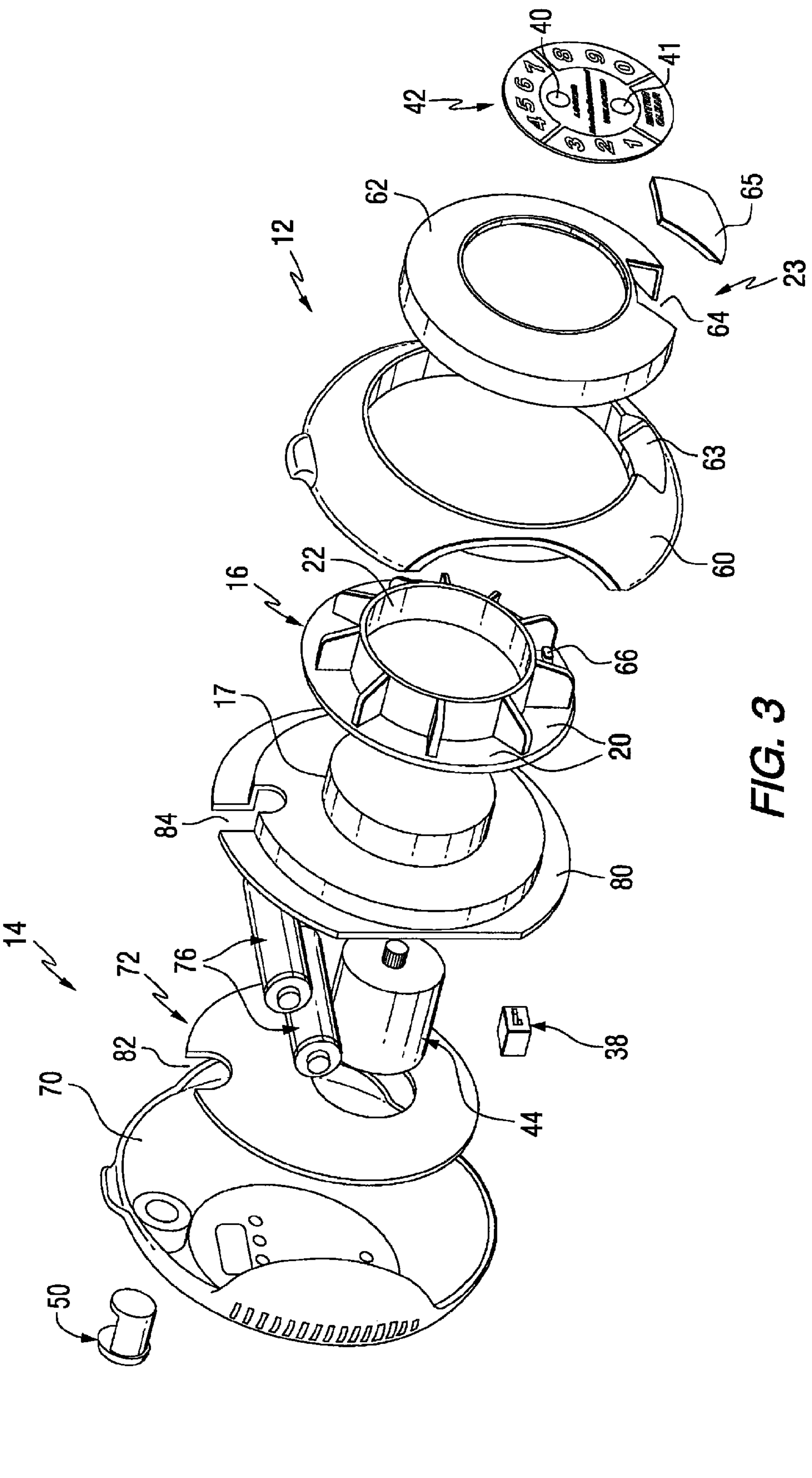
FIG. 3 is another exploded view of a medication on demand device constructed according to the teachings of the present invention.

A more detailed exploded view of the medication on demand device 10 is illustrated in FIG. 3, wherein the upper assembly 12 comprises a housing 60, for receiving a cover 62 (a material for both preferably comprises plastic). A first region 63 of the passage 23 is formed within the housing 60 and a second region 64 thereof is formed within the cover 62. A door 65 provides access to the passage 23. A medication dose 66 rests in a medication retention area 20 of the medication tray 16. Variously shaped and sized medication doses can be accommodated within the retention areas 20. Although the medication dose 66 comprises an orally administered dose, the teachings of the invention can be applied to other medication types, and thus such other medication types can be held within the medication retention area 20.

The lower assembly 14 further comprises a housing 70 (preferably formed from a plastic material) carrying a circuit board 72 on which the controller 30 (not shown in FIG. 3) and its associated components are mounted. The motor 44, powered by batteries 76, is mounted within a housing 80. The key switch 50 passes through a notch 82 in the circuit board 72 and a notch 84 in the housing 80. The key switch 50 is electrically connected to the controller 30 as described in conjunction with FIG. 2.

Figure 4:
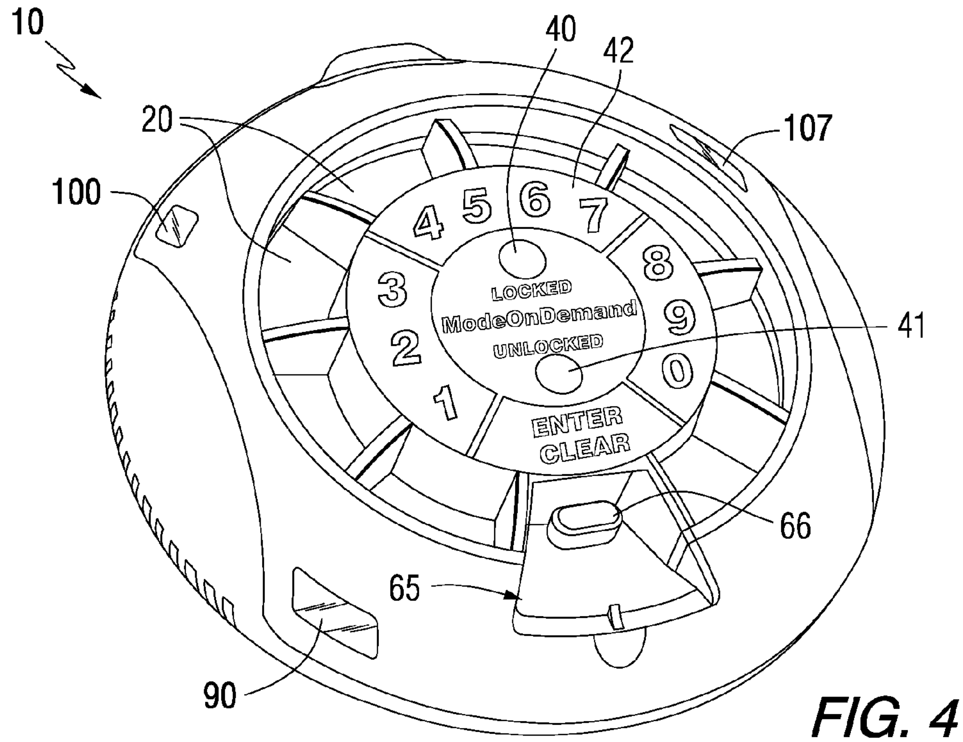
FIGS. 4 and 5 are top and bottom views, respectively, of the medication on demand device of FIGS. 1 and 2.

FIG. 4 is a top view of the medication on demand device 10 illustrating certain of the previously discussed components.

Figure 5:
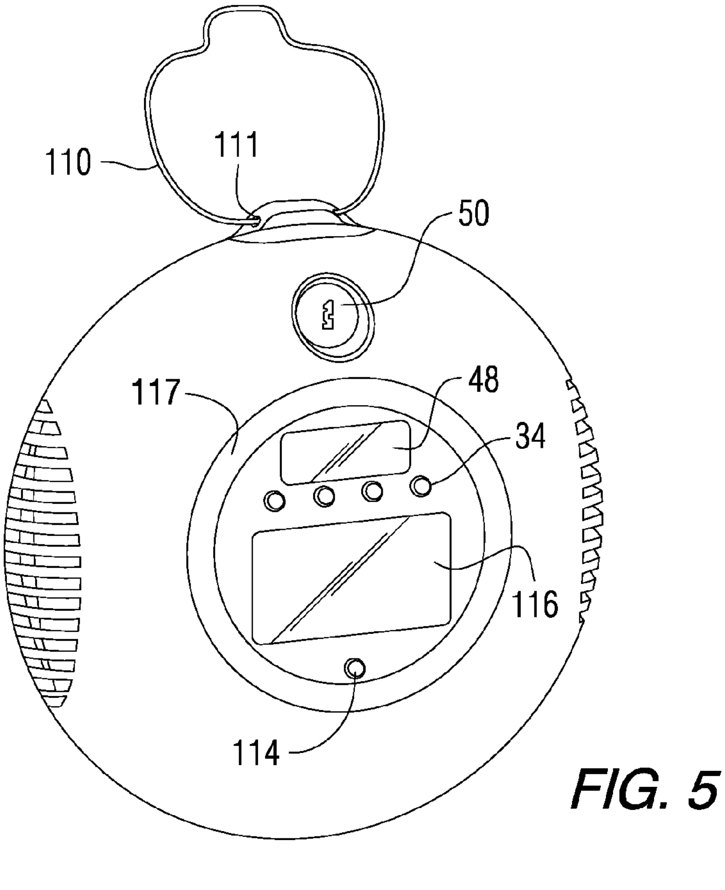

FIG. 5 is a bottom view of the medication on demand device 10 illustrating several of the previously described components of the device 10. A guide wire 110 for securing the medication on demand device 10 to a patient's bed, bedside table or tray passes through a loophole 111. The input device 34 and the clock 48 are also shown in the bottom view of FIG. 5.

The bottom surface of the device 10 further includes a low-battery indicator 114 and a recessed region 116 for receiving, for example, a printed substrate including patient identification information, the medication type and dosage, and the minimum interval between doses. Typically, this information is recorded on adhesive-backed substrate for affixing within the recessed region 116. The device 10 includes a stacking ring 117 for mating with a receiving recess in the upper assembly 12 of a second device 10, thus allowing several devices 10 to be transported and stored in an efficient and stable configuration.

Figure 6:
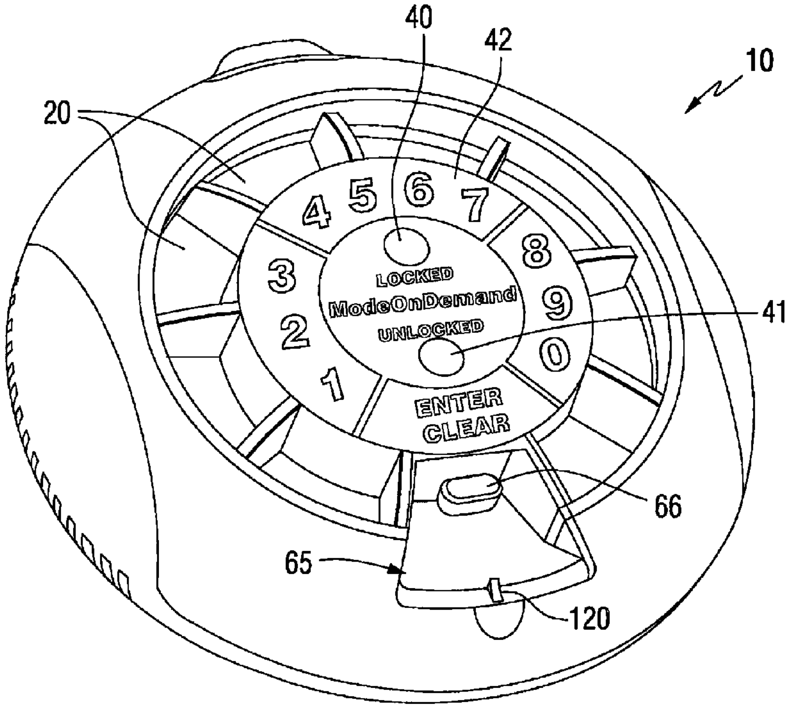
FIG. 6 is a top view of another embodiment of the medication on demand device.

In another embodiment of the present invention, the door 65 is lockable and controllable by operation of the controller 30 (in response to an authenticated patient), such that a door lock 120 in FIG. 6 is released only after the minimum dosing interval has elapsed. In this embodiment, rotation of the medication tray 16 by operation of the motor 44 under control of the controller 30 can occur at any time during the minimum dosing interval, as the patient cannot gain access to the medication dose 66 until the door 65 is unlocked by operation of the lock 120.

Other patient authentication techniques in lieu of entering alphanumeric characters via the keypad 42 can be employed in other embodiments of the present invention. Such authentication techniques include, but are not limited to authentication based on biometric information (e.g., fingerprint, iris scan and voice print), a bar code, an RFID (radio frequency identification) tag or a smart card.

A biometric reader (not shown) operative in conjunction with the medication on demand device prompts the user to enter biometric information that is compared with stored biometric information of the authorized patient. A match authenticates the patient for accessing the next medication dose according to the various medication access structures and techniques of the present invention.

Figure 7:
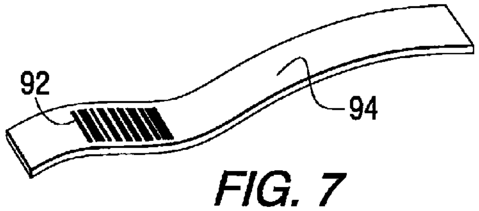
FIGS. 7, 8 and 9 illustrate various patient authentication devices for use with the medication on demand device of the present invention.

According to another embodiment, the medication on demand device comprises a bar code reader 90 (see FIG. 4) for reading a unique bar code 92 (see FIG. 7) assigned to the patient and printed on a patient's wristband 94 (see FIG. 7). If a stored bar code matches the scanned bar code 92 the scanning party is authenticated to use the medication on demand device and access the next medication dose. A bar code process can also be used to authenticate the attendant to perform programming and override functions as described elsewhere herein.

Figure 8:
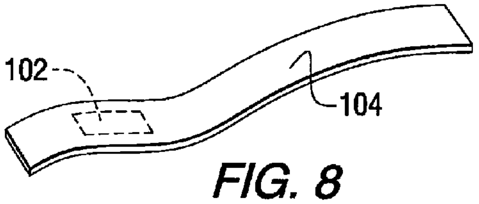

In yet another embodiment, the device 10 includes an RFID reader 100 (see FIG. 4). The RFID tag reader 100 communications with a unique RFID code tag 102 incorporated into a patient's wristband 104 as illustrated in FIG. 8. The tag reader 100 and the tag 104 operate according to any of the known RFID technologies (e.g., magnetic or electromagnetic).

Figure 9:
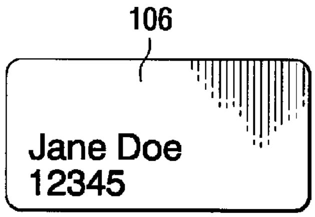

In still another embodiment a patient is provided with a smart card 106 (see FIG. 9) for reading by a smart card reader 107 (see FIG. 4). Use of the smart card 106 and corresponding reader 107 offers another technique for authenticating the patient.

It is also preferable to authenticate the attendant to ensure that only authorized persons are permitted to program the medication on demand device. Such authentication can be provided by any of the authentication techniques described above, e.g., a key pad for entering an alphanumeric code, a bar code operative with a bar code scanner, an RFID tag/reader, a smart card operative with a smart card reader, a biometric reader or another authentication technique based on unique information suitable for authenticating an attendant.

Other personal identification techniques are known in the art and can be incorporated into an embodiment of the medication on demand device of the present invention. The use of any such techniques and their associated structural components are considered within the scope of the present invention.

The medication on demand device is programmed to permit dosing in accordance with the minimum dosing interval and receive patient identification information to authenticate the patient. Additional programmable features may include, a first dose time or first does interval (i.e., time from the present time until the first dose is dispensed), a medication name, and identification information for an attendant having authority to program or override the minimum dosing interval (thereby permitting the patient to receive a medication dose prior to expiration of the minimum dosing interval), and authority to access and remove the mediation carousel for replacing with a carousel carrying medication doses. The medication on demand device can also be reprogrammed to modify any previously programmed parameters.

According to one embodiment, the device is programmed through a separate computer or processing platform (a programming platform) such as a laptop/notebook computer or a personal digital assistant connected to the device through a communications link, such as a wired, wireless or infrared link. A software application executing on the programming platform receives input information from a programming user and in response programs the device.

In another embodiment, the medication on demand device is integrated with an institution's (e.g., hospital) information technology network with network computers on the hospital wards. The device is programmed through the network computers. In yet another embodiment, an interactive programming platform at the patient's bedside can be used to program the device. A television screen at the patient's bedside can serve as a display during the programming process.

The programming platform can also query the medication on demand device to determine information regarding self-administered medication doses, such as when doses were made available to the patient after the minimum dosing interval. The retrieved dosing (e.g., date and time) information is recorded in the patient's medical record and invoiced against the patient's financial record. Every administered medication dose is also tracked by a pharmacy inventory system such that when a dose is administered it is deleted from the pharmacy inventory. The attendant can also query the device to determine if the patient has administered all doses, a condition requiring the ordering of and installation of a filled medication tray.

In yet another embodiment, the medication on demand device generates and stores a record of its operation, including authentication operations, rotation of the medication tray or carousel to present doses for self-administration and override operations.

In another embodiment the device is programmed to determine when all medication doses in the tray have been accessed by the patient. In response thereto the device signals (through one of a communications link) the attendant or pharmacy to supply a new medication carousel.

The programming platform can also unlock the device, as discussed further below, permitting the attendant to replace the medication tray.

In an embodiment employing a wired connection between the programming platform and the medication on demand device, the programming platform is carried to the site of the device, typically the patient's bedside, and connected to the device through the wired connection. The programming application is executed on the programming platform to program and/or query the device.

In a wireless embodiment, the device comprises wireless communications components (not illustrated) for receiving and processing radio frequency signals transmitted by the programming platform to program and/or query the device. For use in a treatment center environment, the programming platform can be located at a nurse's station to program and query all devices in the area. In another embodiment the programming platform is carried on a medication cart to the bedside of each patient. In still another embodiment, the programming platform is in a pharmacy responsible for supplying the medication carousel.

According to another embodiment, an authenticated attendant can override the programmed minimum dosing interval, permitting immediate rotation of the medication tray into a position where a dose is accessible.

Figure 10:
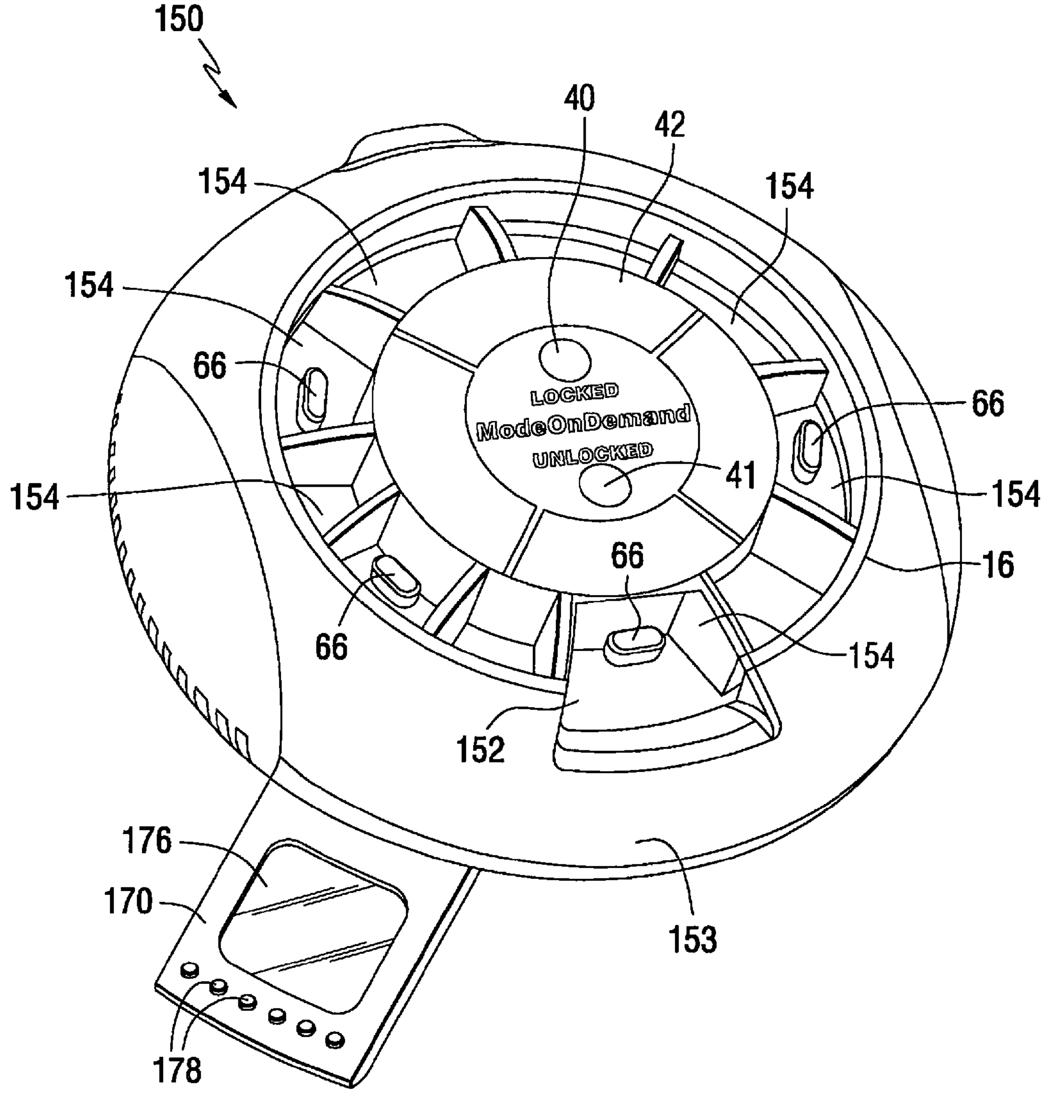
FIG. 10 is a perspective view of another embodiment of a medication on demand device according to the teachings of the present invention.

FIG. 10 illustrates an embodiment of a medication on demand device 150 including an opening 152 in a cover 153. Unlike the embodiments described above, the embodiment of FIG. 10 lacks the door 65. Instead, the motor 44 under control of the controller 30, rotates a medication retention area 154 into alignment with the opening 152 after the minimum dosing interval has elapsed and after the user has been authenticated (according to one of the identification techniques described elsewhere herein) as the authorized patient. Once the opening 152 and the medication retention area 154 containing a medication does 66 are aligned, the patient can remove the medication dose 66 from the retention area 154 through the opening 152. Although the present description refers generally to a single medication dose within the retention area 154, the invention is not limited to such an application, as a plurality of doses can be disposed within one retention area 154 if the area is properly sized. Also, the medication on demand device can dispense medications other than pills if the retention areas are properly sized. Further, multiple medication types can be loaded into any retention area 154, including loading more than one medication type into any retention area 154.

The medication dose 66 remains accessible through the opening 152 for patient removal for a predetermined time, about 25 seconds in one embodiment, which should be sufficient for the patient to remove the medication dose 66. After this time has elapsed, the medication tray 16 is rotated by action of the motor 44 under control of the controller 30 to present an empty medication retention area 154 into alignment with the opening 152. This configuration is referred to as the locked, closed or off configuration or condition. The device 150 is in an opened, on or dose configuration or condition when the medication dose 66 is accessible by the patient through the opening 152. In one embodiment the indicator 40 illuminates during the entire locked period.

The medication on demand device 150 remains in the locked configuration until the timer 36 determines that the minimum dosing interval has elapsed, at which time the indicator 41 is illuminated to indicate that the patient is permitted to administer the next dose. The patient is authenticated and the medication tray 16 rotates to present another retention area 154 containing a medication dose 66 into alignment with the opening 152. The medication tray 16 remains in this dose-accessible position for the predetermined time, after which another tiring cycle begins. To accommodate this embodiment the medication tray 16 comprises alternating empty and medication-carrying retention areas 154.

According to another embodiment also illustrated in FIG. 10, the medication on demand device 150 further comprises an optional tray 170 locked into a closed position within the device 150 and releasable therefrom into an open or extended position as illustrated in FIG. 10. Various embodiments of the tray 170 comprise a display 176 and/or user-activated keys 178 for use in combination or independently to program the medication on device 150 as described above. In particular, the device 150 must be programmed with a physician-ordered dosing interval and patient identification information for use in authenticating the patient and the attendant for programming the device 150.

In yet another embodiment, the device 150 is programmed using a stylus or pen interacting with the display 176 as is known in the art. After programming, the tray 170 is returned to the closed/locked position within the device 150. Various mechanical locking devices are known for locking the tray 170 in position while permitting convenient release and extension of the tray when it is desired to program the device 150. The display 176 and the keys 178 can also be used to query the device 150, for example to determine when the medication doses 66 have been self-administered for recording in the patient's medical record.

Figure 11:
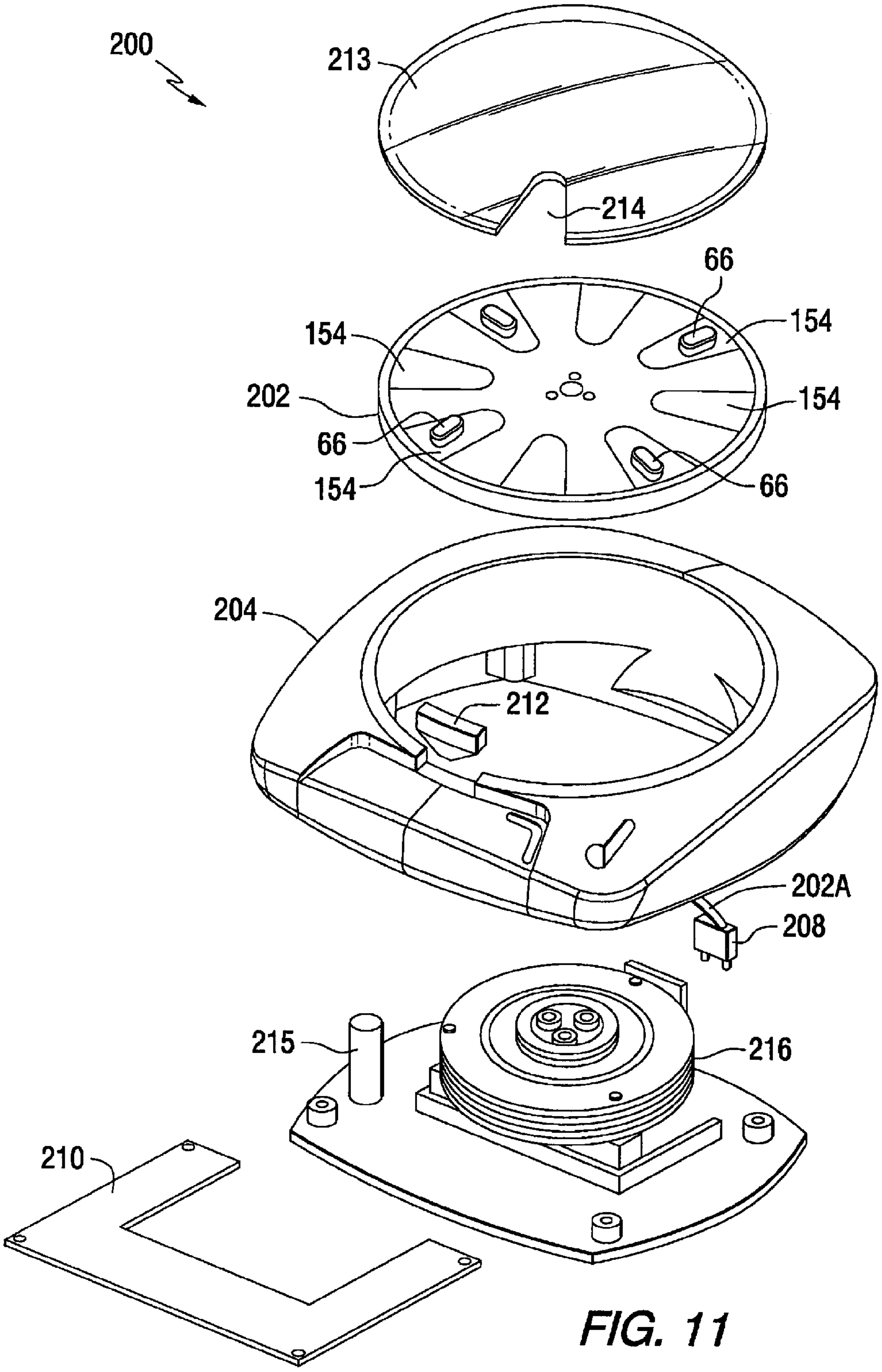
FIG. 11 is an exploded view of another embodiment of a medication on demand device constructed according to the teachings of the present invention.

FIG. 11 illustrates yet another embodiment of a medication on demand device 200 comprising a housing 204 for receiving a removable drug tray 202 further comprising medication retention areas 154, with alternating retention areas holding a medication dose 66.

A dome or cover 213, comprising a transparent (in one embodiment) material having a hemispherical or planar shape, defines an opening 214 therein and overlies the drug tray 202. The device 200 further comprises an indicator 212 for indicating that the minimum dosing interval has elapsed and thus the device can provide access to another medication dose 66 for an authenticated patient.

The motor 44 (hidden from view in FIG. 11) drives a planetary gear or wheel 216 to incrementally rotate the tray 202 to align successive retention areas 154 with the opening 214 at the end of each incremental rotation. A bottom surface of the tray 202 further comprises a plurality of tabs or protrusions extending therefrom for depressing a lever arm 208A of a tray indexing switch 208 as the tray 202 rotates. The tabs are spaced around the tray 202 according to a location of the medication retention areas 154 within the tray 202. Depression of the lever arm 202A closes (or opens in another embodiment) switch contacts. A control element determines a position of one of the medication retention areas 154 relative to the opening 214 by detecting incremental rotation of the tray 202 that closes (or opens in another embodiment) the switch contacts as the tabs depress the lever arm 208A. In response thereto the control element controls the motor 44 to terminate tray rotation when the opening 214 is aligned with one of the medication retention areas 214.

An empty tray 202 is detected based on a number of incremental rotations equal to a number of retention areas 154 in the tray 202. Using any of the communications techniques described elsewhere herein, an empty tray designating signal is sent from the medication on demand device 200 to a party or site (e.g., nursing station, pharmacy, medication cart) responsible for replacing the empty tray, The device 200 further comprises a solenoid 215 that engages the dome 213 to prevent unauthorized tampering with or removal of the dome 213 to access the medication doses 66. The solenoid 215 is disengagable when it is necessary to load a new tray 202 into the housing 204. According to the embodiment including the solenoid 215, the commands entered through a user interface (any wired or wireless communications technique) can unlock the dome 213 by disengaging the solenoid 215.

Figure 13:
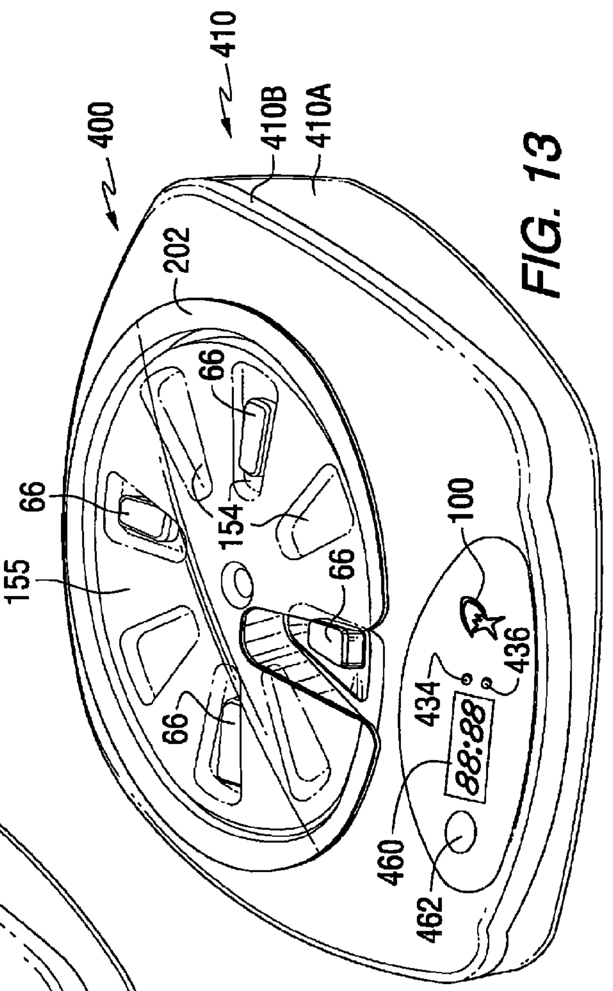
FIGS. 12 and 13 illustrate another embodiment of a medication on demand device according to the teachings of the present invention, in a "on" and "off" condition respectively.
Figure 12:
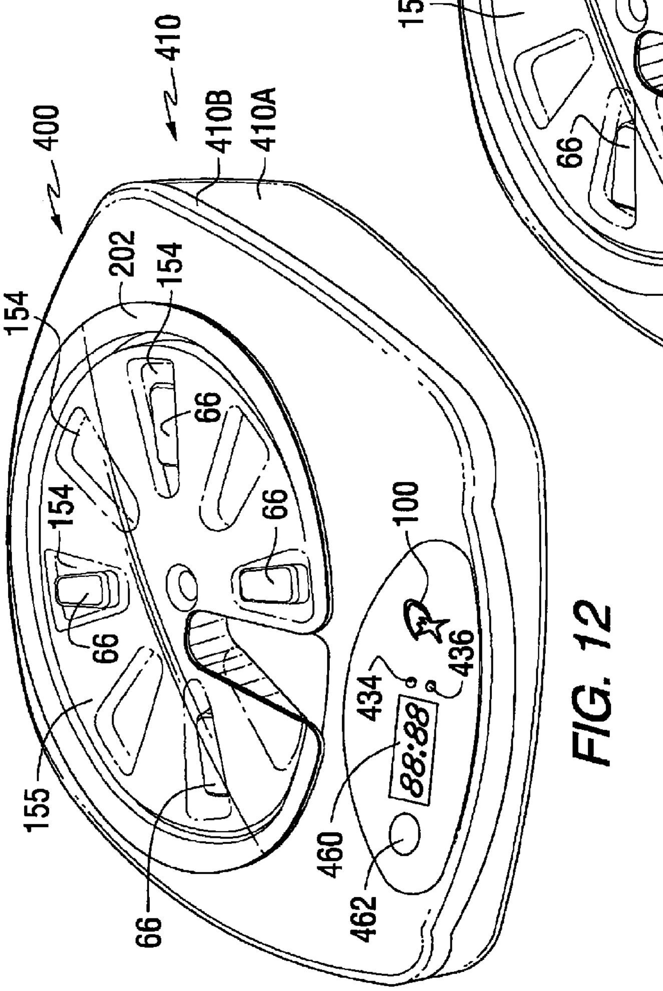

FIGS. 12 and 13 illustrate another embodiment of a medication on demand device 400, constructed according to the teachings of the present invention, comprising a housing 410, further comprising a lower housing 410A and an upper housing 410B. See also the exploded view of FIG. 14. FIG. 12 illustrates the device in the "off" or "closed" condition (presenting a blank area 155 disposed between two adjacent medication retention areas 154 through an opening 430A, see FIG. 14) and FIG. 13 illustrates the device in the "dose" or "on" condition (presenting a medication dose 66 through the opening 430A). Alternate medication retention areas 154 are empty and in the "off" condition an empty retention area is presented through the opening 430A.

An opening 414 within the upper housing 410B (see FIG. 14) receives a removable medication drug tray or carousel 418 further comprising the medication retention areas 154. In a preferred embodiment, alternating retention areas 154 carry a medication dose 66.

A cover 430 having a substantially flat or slightly hemispherical shape is removably disposed over the carousel 418. A material of the cover 430 comprises transparent, translucent or opaque material, the former two embodiments allowing visual inspection of the medication retention areas 154 to determine the existence of a medication dose 66 within the areas 154.

The carousel 418 is rotated relative to the cover 430 to align an opening 430A in the cover 430 with one of the medication retention areas 154. In the dose or on configuration the carousel 418 is positioned to permit a patient to access a medication dose 66 in a mediation retention area 154 through the opening 430A. See FIG. 13. In the off or closed configuration a blank region 155 or an empty retention area 154 is aligned with the opening 430A and thus a drug dose is not available. See FIG. 12.

In an embodiment comprising a transparent or translucent cover 430, the medication doses 66 are visible through the cover 430. The attendant can correlate the remaining dose count in the tray 418 with data, as collected by the medication on demand device (as described further below) indicating the dates and times the tray was rotated to present a dose to the patient, to determine which doses were not removed from the carousel by the patient. Additionally, the medication on demand device logs tray changes (i.e., a new carousel installed), administration of override doses (i.e., the minimum dosing interval has not elapsed but the patient is permitted an intervening dose due to considerable pain) and executions of a waste tray program (i.e., the patient has been discharged or is no longer using the medication on demand device and a partially filled tray is removed and the remaining doses are "wasted" or disposed of), which must also be considered by the attendant. As further described below, this information as collected by the medication on demand device is added to the patient's medical record or chart. Review of the chart will thus also permit the attendant to correlate the remaining doses with the doses administered.

In a preferred embodiment, the upper housing 410B captures the cover 430 as openings 431 (in one embodiment three openings, but only two shown in FIG. 14) in the upper housing 410B receive corresponding tabs 432 (only one shown in FIG. 14) extending from a periphery of the cover 430. Each opening 431 comprises a wider insertion region and a narrower capture region. After inserting the tabs 432 into the insertion regions of each opening 431, the cover 430 is rotated in a first direction, capturing the tabs 432 within the capture region to attach the cover to the upper housing 410B. Rotating the cover in an opposite second direction permits removal of the cover 430 (for example, to insert a restocked or new carousel 418) as the tabs 432 are displaced to the insertion region of each opening 431. The cover 430 is further locked to the upper housing 410B, as described below, to prohibit cove removal and access to the medication doses 66.

The medication on demand device 400 further comprises illuminating elements 434 and 436, in a preferred embodiment each comprising a light emitting diode, for indicating various states and conditions of the device. For example, one or both of the elements 434/436, according to various embodiments, indicate a low battery condition, a battery-charging condition (as described below), an operating mode (e.g., the dosing interval has elapsed and the device is ready to deliver the next dose after the patient is authenticated), certain override conditions as described elsewhere herein, an inoperative mode, an empty carousel (i.e., all medication doses have been administered) and the elapsed time until the next dosing has not yet expired.

The medication on demand device 400 further comprises a display 460 for displaying the time remaining until the next permitted dose. Thus the display 460 displays a decrementing count from the time when the last dose was permitted, reaching a zero count when the minimum dosing interval has elapsed. When the display count reaches zero, the patient activates a control element 462 and then swipes the RFID tag proximate the RFID reader 100 (on the face of the medication on demand device) to rotate the carousel 418 and present a medication dose 66 through the access opening 430A. See FIGS. 12, 13 and 14. The display 460 also displays a decrementing count (about 30 seconds in one embodiment) from a time when the carousel 418 is moved to the "dose" condition until the carousel 418 is rotated to the "off" condition, i.e., a dose available interval. The patient is required to remove the dose 66 during this interval, as the dose will not be available once the dose available interval has ended.

If the patient does not need the dose when the display count reaches zero, the patient should preferably not activate the control elements 462. During a "lockout" period, i.e., anytime between administered doses or if a dose is skipped (by activation of the control element and swiping the RFID tag, but the dose is not removed from the retention area), the patient can request a dose from the attendant. As further explained elsewhere herein, the attendant can override the "lockout" period, permitting the carousel to rotate and present a medication does to the patient. The "lockout" dose is recorded by the medication on demand device and further the attendant should note the prior skipped dose and the "lockout" dose in the patient's record.

Figure 14:
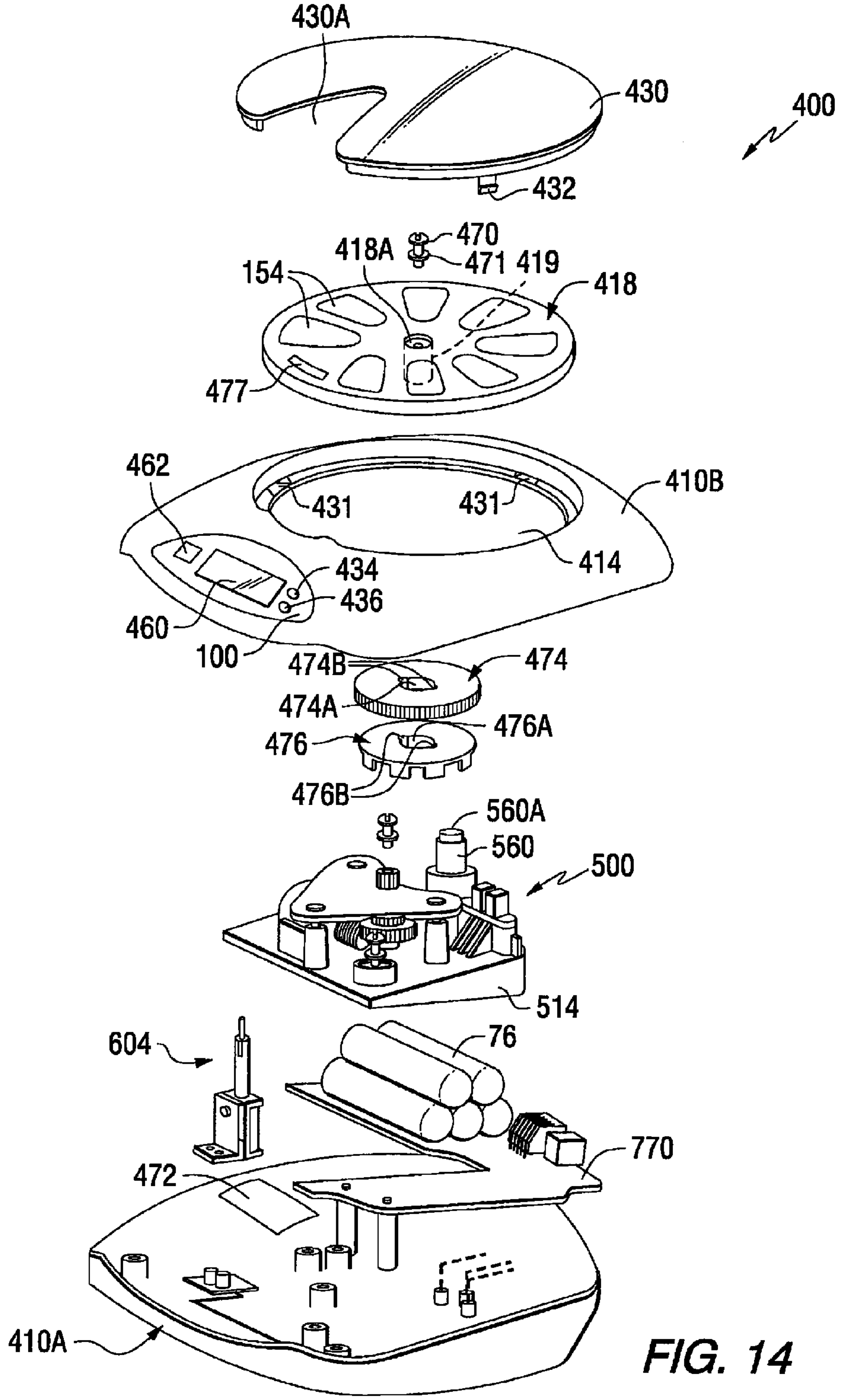
FIG. 14 is an exploded view of the embodiment of FIGS. 12 and 13.

With reference to FIG. 14, a threaded body portion of a screw 470 passes through a washer 471, an opening 418A in the carousel 418, a spindle 419 extending from the carousel 418, an opening 474A in a planetary gear 474, an opening 476A in a trip disc 476 to threadably engage an opening 560A in a boss 560, to assemble the elements into a unified assembly for driving by a motor 508 (see also FIGS. 15, 16, 17 and 18) and its associated gearing as described below.

The planetary gear 474 defines one or more notches 474B within the opening 474A and the trip disc 476 defines one or more notches 476B within the opening 476A. See FIG. 14. The notches 474B and 476B engage corresponding tabs 419A (see FIG. 15) disposed on the spindle 419 to properly align the planetary gear 474 and the trip disc 476 relative to the retention areas 154 when both are received on the spindle 419. See FIG. 15.

To ensure that the medication doses supplied in the carousel 418 are intended for the patient to whom the carousel was delivered, the carousel includes an RFID tag 477 (written or programmed in the pharmacy when the medication is loaded into the carousel) that is read by an RFID reader (e.g., the RFID reader 100) within the medication on demand device. The medication on demand device determines that the patient identification information included within the carousel tag 477 matches the patient identification information stored within the medication on demand device. An affirmative match enables operation of the medication on demand device. A mismatch disables the medication on demand device, preventing the patient from self administering an incorrect medication.

For a new patient, i.e., the carousel RFID tag 477 carries new patient identifying information and further is accompanied by the RFID wristband 104 of FIG. 8. The attendant loads this information to the medication on demand device by scanning the RFID tag 477 proximate the reader 100. Once the medication on demand device is programmed with the correct patient identification information and the minimum dosing interval, the patient is given the RFID wristband 104 for later use in controlling operation of the medication on demand device. Note that the wristband 104 and the carousel tag 477 carry the same patient identifying information.

Figure 15:
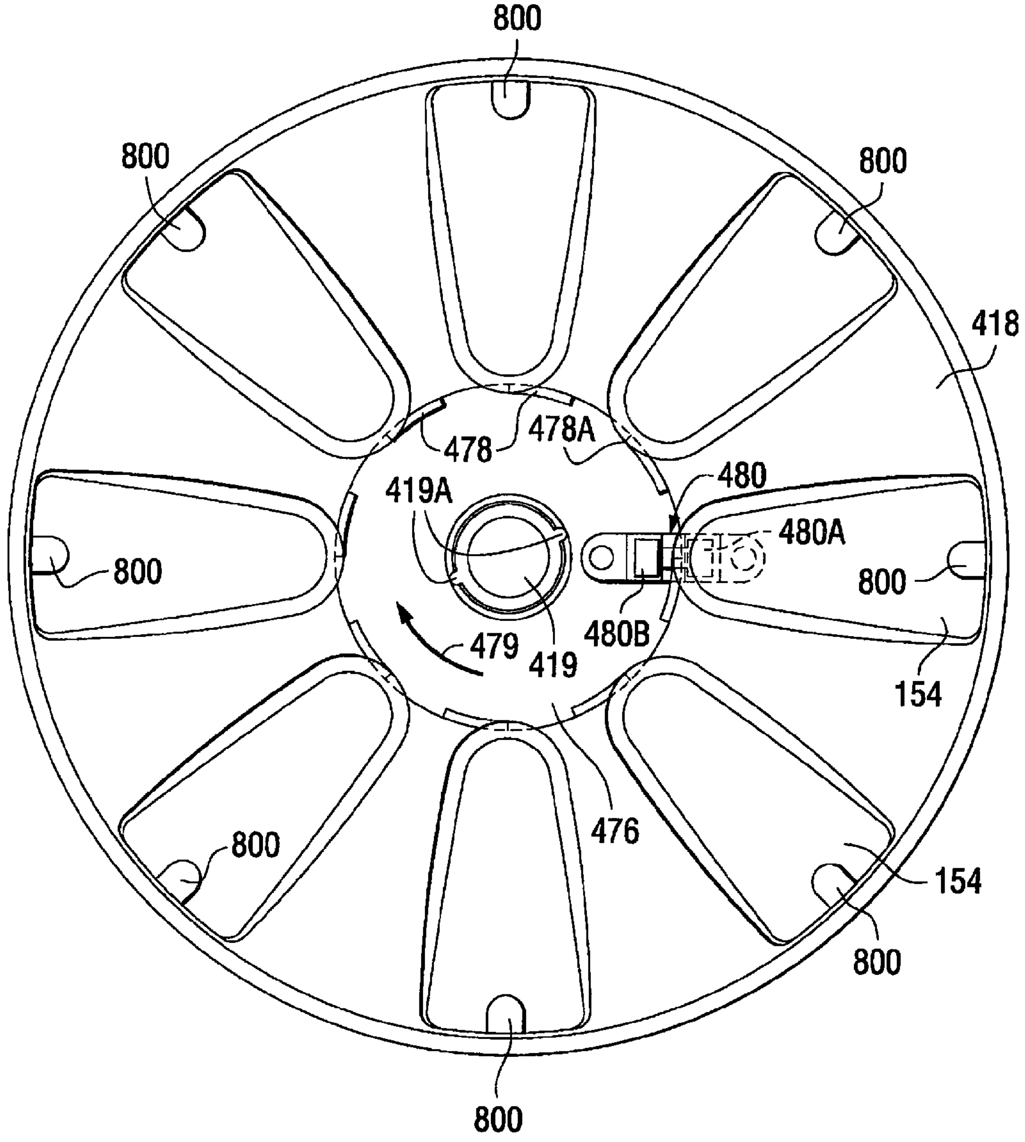
FIGS. 15 and 16 are a respective top and side view of the carousel of the medication on demand device of the present invention.
Figure 16:
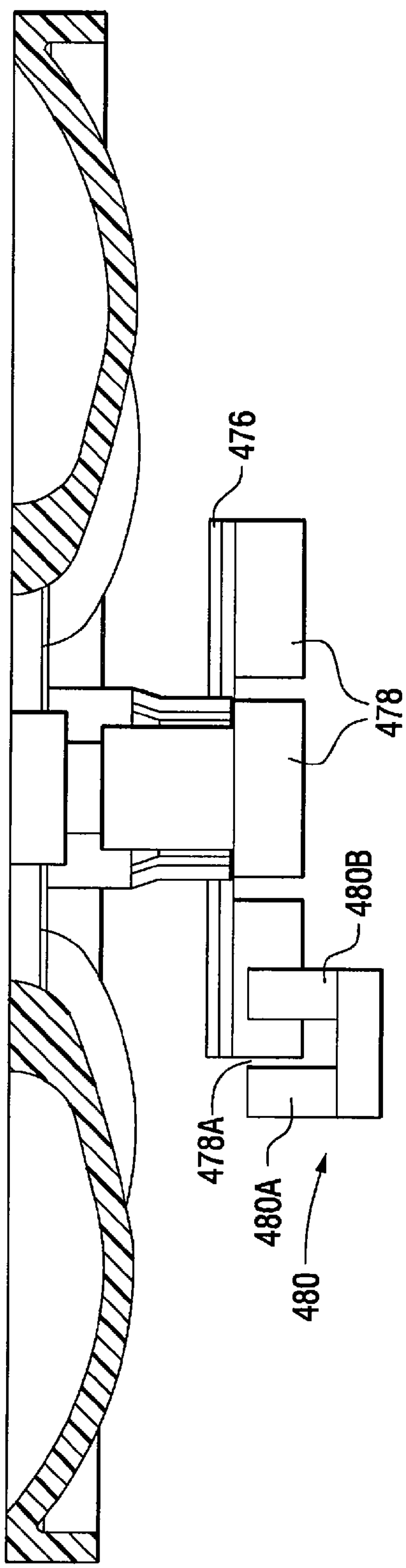

During the programming process for a new patient, in addition to programming the minimum dosing interval (also referred to as the lockout time), the attendant programs the medication on demand device with a first dose order, i.e. the time of the patient's first medication dose measured from the present time. This time can be as short as a few minutes to as long as the minimum dosing interval. The first does order provides the patient with access to a medication dose after the first dose interval has elapsed and the patient has been authenticated FIGS. 15 and 16 illustrate a respective top view and side view of the carousel 418 and the trip disc 476, including tabs 478 extending downwardly from a circumferential region of the opening 476A. An arrowhead 479 indicates a rotational direction of the carousel 418.

An emitter/sensor assembly 480 comprising an emitter 480A, a sensor 480B and control electronics not illustrated, utilizes a light or infrared beam emitted by the emitter 480A and impinging the sensor 480B to detect a trailing edge 478A of each tab 478. The trailing edge 478A of each tab 478 is aligned with a center line of each medication retention area 154 as can be seen from FIG. 15. Trailing edge detection indicates that a medication retention area 154 is aligned with the opening 430A in FIG. 14, i.e., the retention area 154 is substantially centered relative to the opening 430A. Rotation of the motor 508 (see FIGS. 17 and 18) is terminated responsive to an edge-detected control signal produced by the emitter/sensor assembly 480 in response to detection of the trailing edge 478A. According to one embodiment, rotation of the motor 508 by manual rotation of the carousel 418 is prevented by the high gear ratio of the motor gear train described below.

Figure 17:
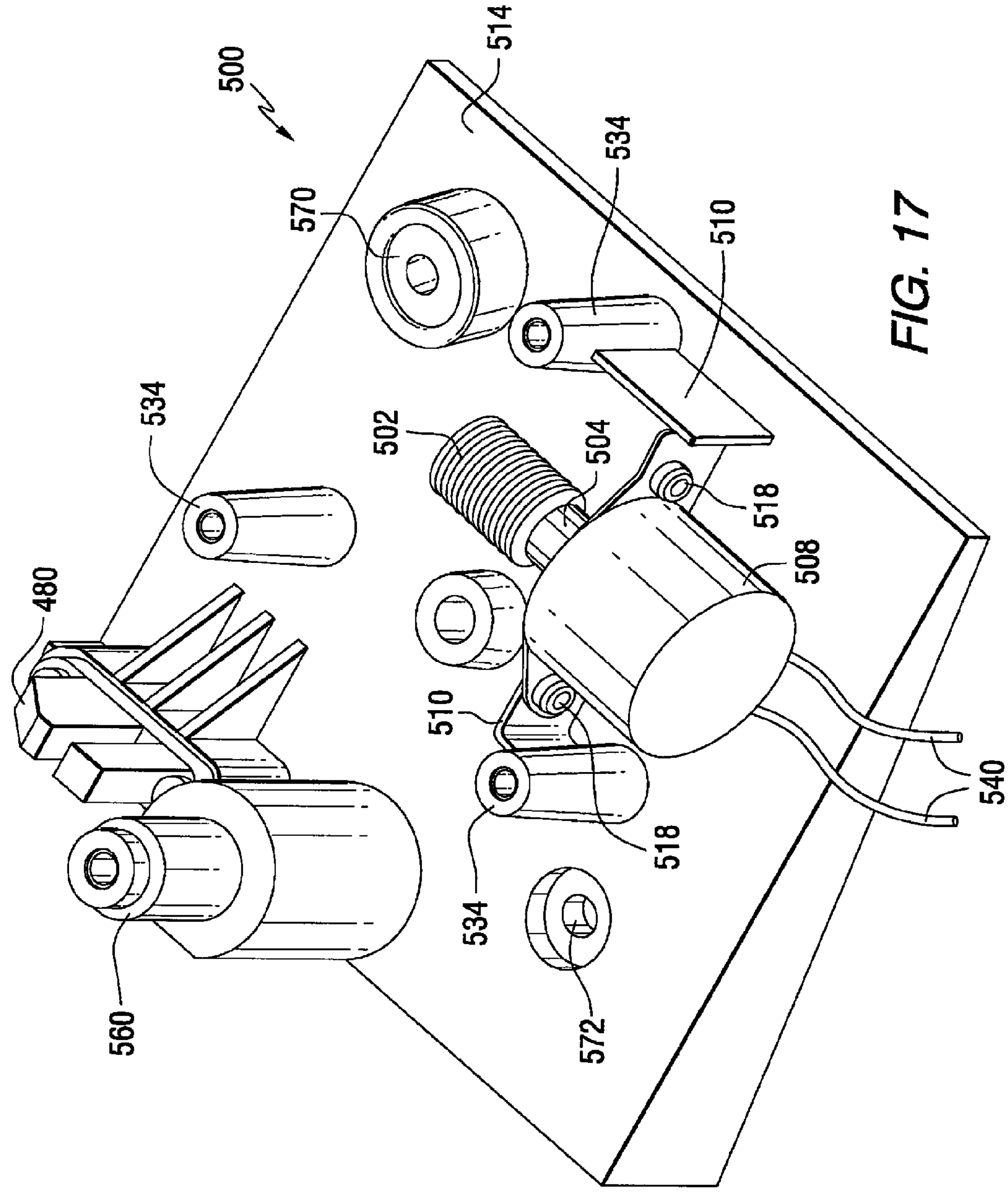
FIGS. 17 and 18 illustrate certain components for rotating the carousel of the medication on demand device of the present invention.
Figure 18:
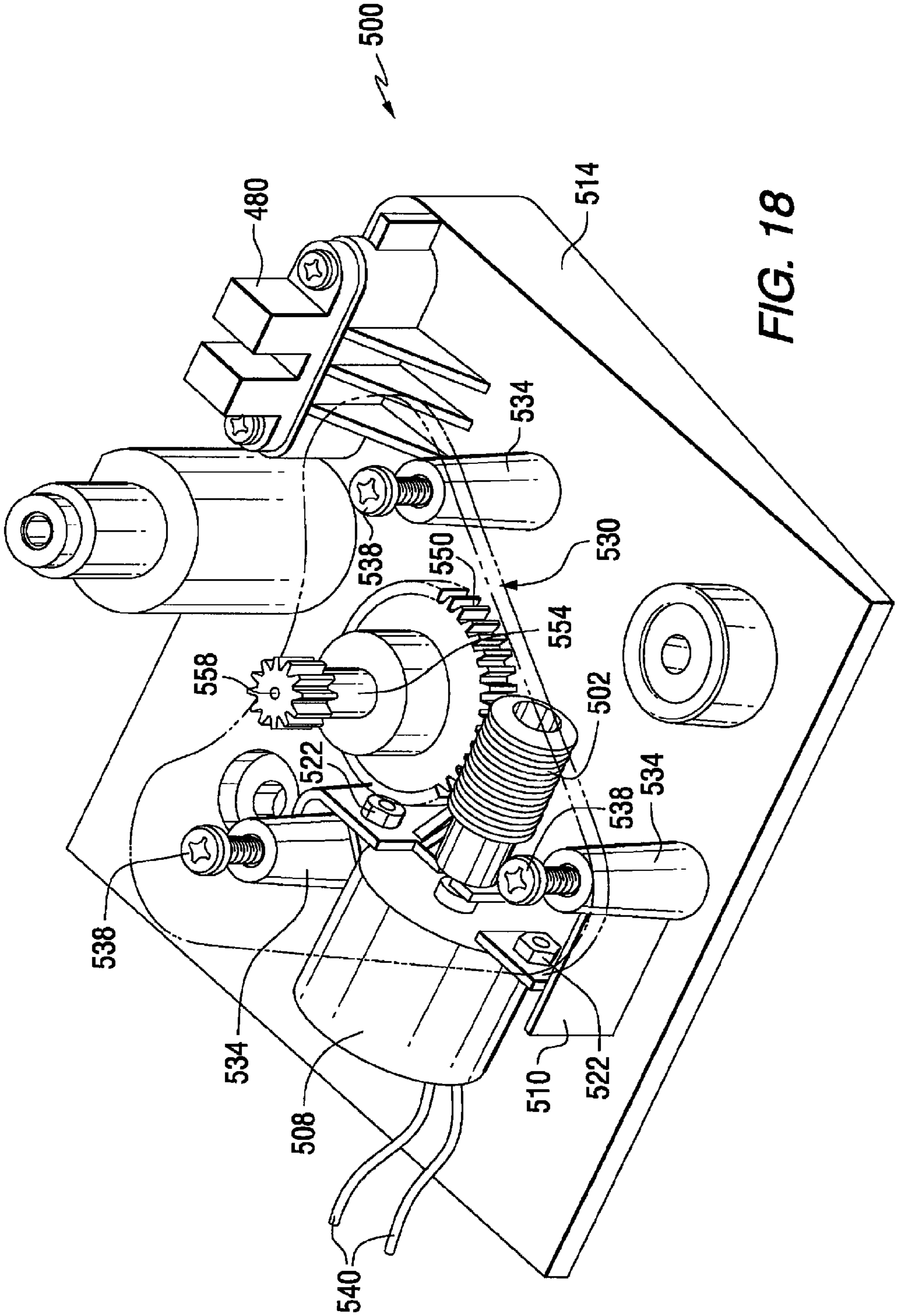

FIGS. 17 and 18 illustrates components of a motor assembly 500, comprising a worm gear 502 frictionally affixed to a shaft 504 of a motor 508. The motor 508 (comprising a stepping motor in one embodiment for more precise rotation when energized and since a conventional motor produces sparks that are not permitted in certain environments where oxygen is in use) is affixed to structural ribs 510 extending from a base 514, in one embodiment using screws 518 and mating nuts 522. In other embodiments other structural elements and attachment components are used to attach the motor 508 to the base 514. The emitter/sensor assembly 480 is also shown in FIGS. 17 and 18.

A gear train plate 530 (shown in outline form in FIG. 18 to permit viewing of underlying components) is removably attached to bosses 534 by common screws 538, each extending through an opening in the gear plate 530 to threadably engage an opening in one of the bosses 534.

Controlled power is supplied to the motor 508 through power leads 540, causing rotation of the motor shaft 504 and driving the worm gear 502. The worm gear 502 drives a gear 550 having a common shaft 554 with a pinion gear 558 that in turn drives the planetary gear 474 (see FIG. 14) attached to the carousel 418 as described in conjunction with FIG. 14. It is known that the interface of the worm gear 502 and the gear 550 resists manually applied forces that tend to drive the worm gear 502 in a reverse direction. Thus it is not possible for the patient to manipulate the carousel in the reverse direction to access and administer an unauthorized medication dose.

A boss 570 and an opening 572 of FIG. 17 receive common screws for attaching the base 514 to the lower housing 410A.

FIGS. 19-22 illustrate elements of an exemplary locking mechanism 600 for locking the cover 430 to the upper housing 410B to prevent unauthorized access to the medication doses by removal of the cover 430.

Figure 19:
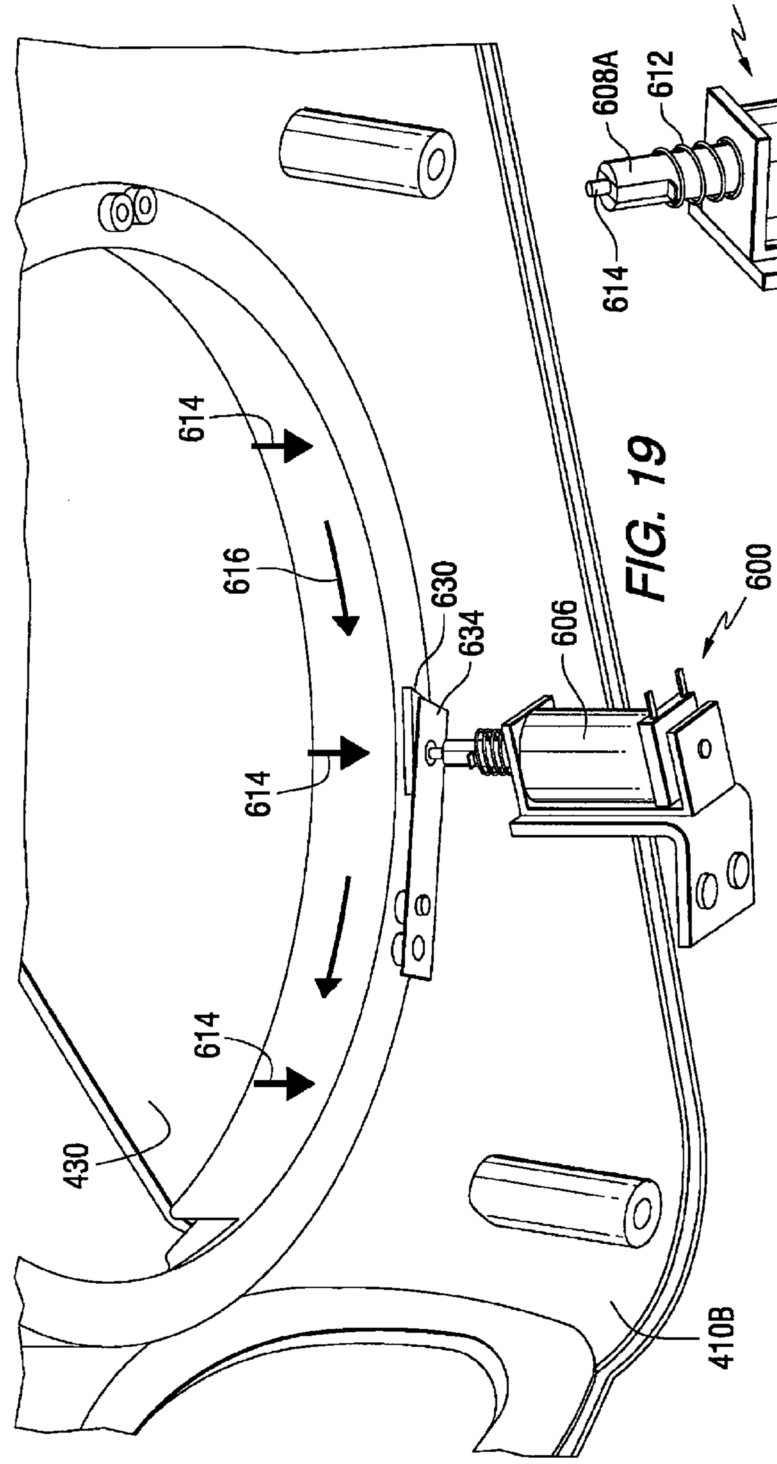
FIG. 19, 20, 21 and 22 depict elements for locking a cover to a base of the medication on demand device of the present invention.
Figure 20:
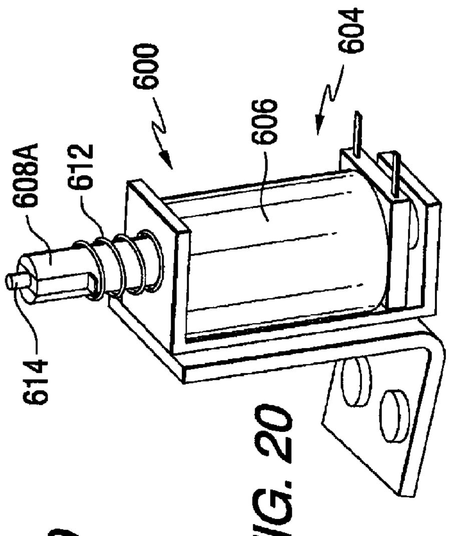

The locking mechanism comprises a solenoid 604 further comprising a coil 606 and a solenoid-driven plunger 608 having a lower portion disposed within coil 606 (in the illustrated solenoid configuration) and thus hidden from view in FIGS. 19 and 20, and an upper portion 608A extending from the coil 606 as illustrated. A spring 612 biases the pin 608 to an extended position as illustrated in the detailed view of FIG. 20. A pin 614 terminates the upper portion 608A.

Figure 21:
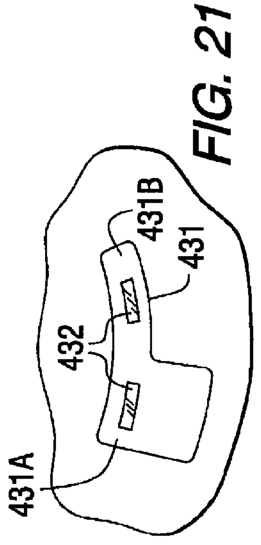
Figure 22:
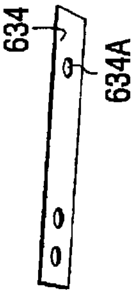

To attach and lock the cover 430, the cover is placed in the opening 414 (see FIG. 14) of the upper housing 410B such that the tabs or protrusions 432 (also illustrated in FIG. 14) on an underside lip of the cover 430 (see FIG. 14) are received within the respective insertion region 431A of the openings 431. Arrowheads 615 depicted in FIG. 19 represent the downward movement of the cover 430 into the opening 414 and the corresponding insertion of the tabs 432 into the insertion region 431A. See FIG. 21 illustrating an underside view of one of the openings 431 and the tab 432 disposed therein, wherein both positions of the tab 432 are illustrated in phantom.

As the tabs 432 are received within the insertion regions 431A, one of the tabs 432 deflects a leaf spring 634, attached to the upper housing 410B as illustrated in FIG. 19, in a direction away from the upper housing 410B. An opening 634A defined in the spring 634 receives the pin 614.

Application of a rotational force (depicted by arrowheads 616 in FIG. 19) displaces each of the tabs 432 from the insertion region 431A to the capture region 431B. See FIGS. 19 and 20. As the tab deflecting the leaf spring 434 rotates, the pin 614 extends upwardly into the insertion region 431A to prevent cover rotation in a direction opposite the arrowheads 616, locking the cover 430 within the upper housing 410B and preventing unauthorized access to the medication doses, for example, unauthorized access between doses.

Supplying power to the solenoid 604 energizes the coil 606, drawing the plunger 608 into the coil 606 and causing the pin 614 to withdraw from the opening 634A of the leaf spring 634. The cover lock is released and rotation of the cover 430 allows removal as described above in conjunction with FIG. 14. According to various embodiments of the device, the solenoid 604 can be energized through the programming software application described above and/or manually by the patient's attendant by operational features at the medication on demand device. For example, in one embodiment the attendant activates the control element 462 for a predetermined duration of about five seconds. After the duration has elapsed, one of the illuminating elements 434 or 436 is illuminated, indicating that the attendant can swipe an attendant card for reading by the RFID reader 100 (or another authentication device), supplying power to and energizing the solenoid 604 to unlock the carousel 418.

Figure 23:
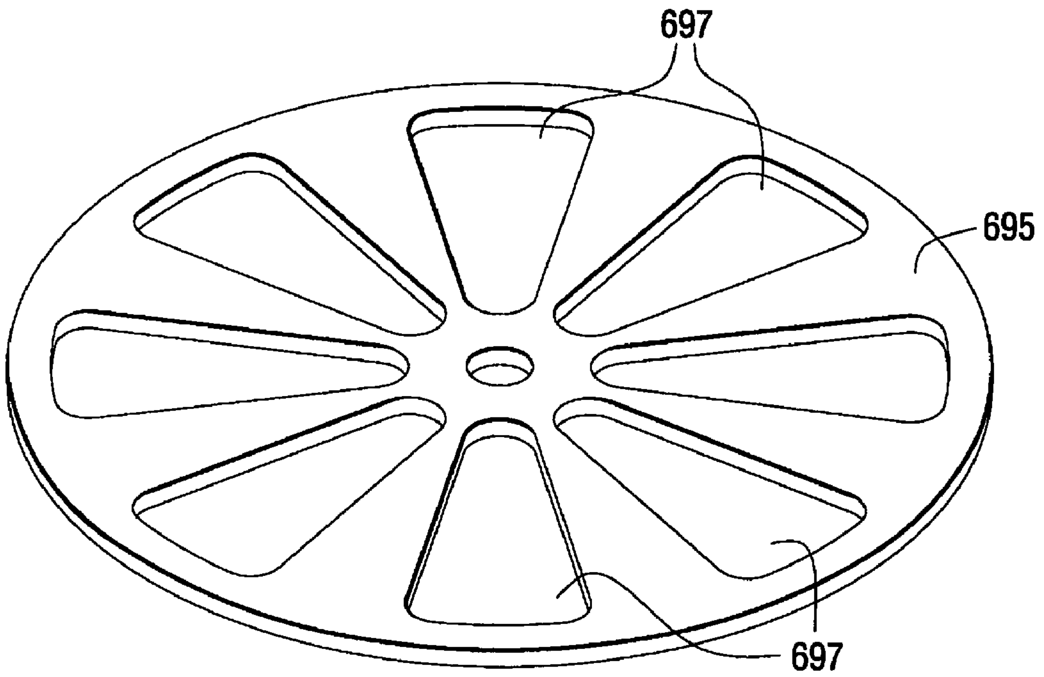
FIG. 23 illustrates a medication tray insert for use with the medication on demand device of the present invention.

As described above, the invention comprises the carousel 418 for carrying the medication doses within retention areas 154. In another embodiment a tray insert 695 (see FIG. 23), having a shape and size substantially similar to the carousel 418 overlies the carousel 418. Retention areas 697 of the insert 695 are received within the retentions areas 154 of the carousel 418. A material of the insert 695 comprises a relatively light weight material. According to this embodiment it is not necessary to remove the empty carousel 418 from the medication on demand, instead the insert 695 is removed and a restocked insert 695 is mated with the carousel 418. Medication doses are placed within the dose retention areas 697 in a pharmacy and the insert covered to retain the doses within the areas 697. The insert 695 is then supplied to the attendant for loading into the medication on demand device. In this embodiment the RFID tag discussed above in conjunction with FIG. 14 is applied to the insert 695.

In yet another embodiment, each dose 66 is enclosed within a package or wrapper carrying a bar code representing the medication type and dosage. The attendant swipes the medication bar code for reading by the bar code reader 90 (see FIG. 4). The medication bar code is compared with the stored medication type and dosage information and responsive to a match operation of the medication on demand device is permitted. In an alternative embodiment, the medication is identified by an RFID code in lieu of a bar code.

Figure 24:
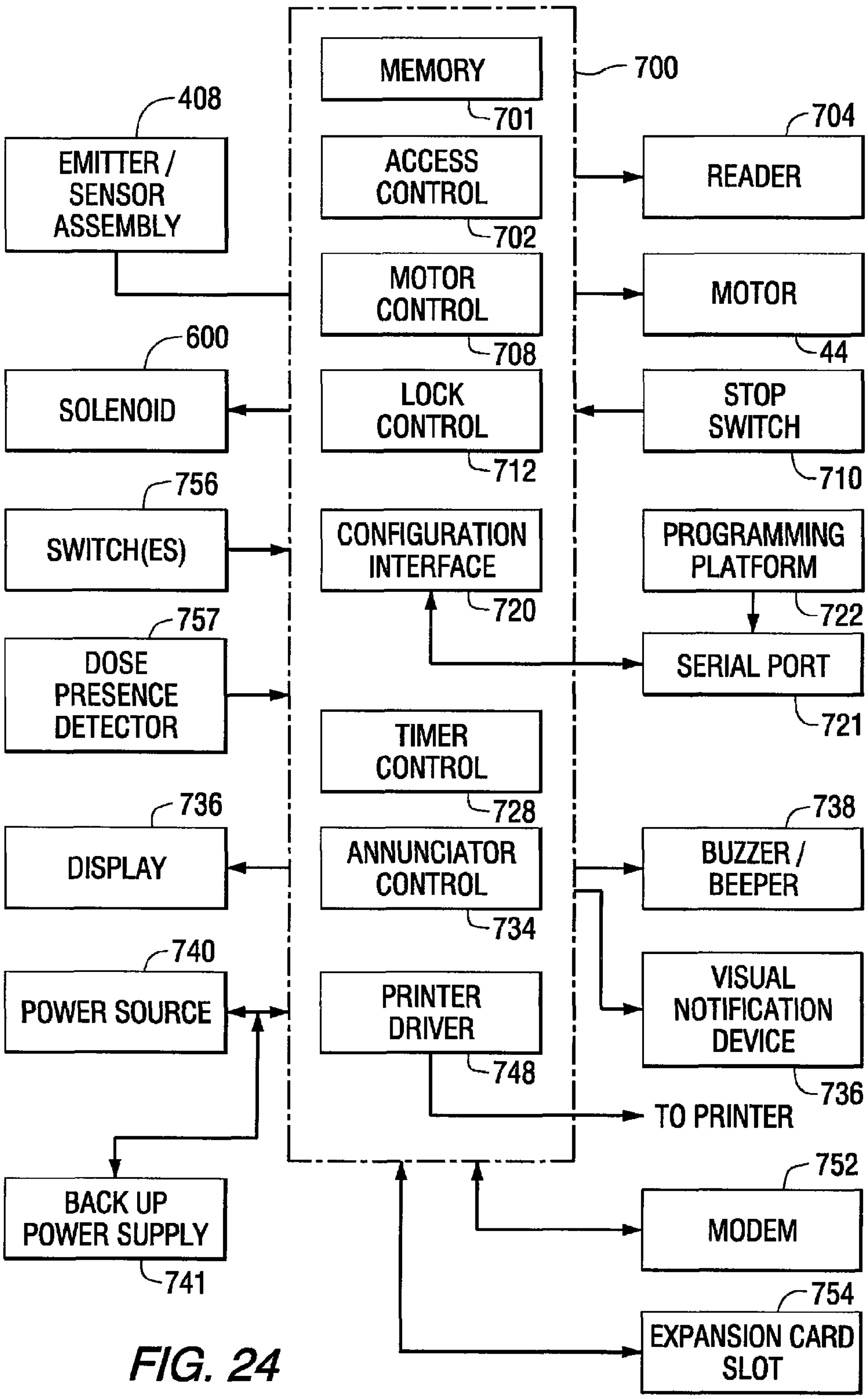
FIG. 24 illustrates a functional block diagram of the controlling and the controlled components according to one embodiment of the present invention.

FIG. 24 illustrates a functional block diagram of one embodiment of a controller 700, and certain controlled components, for implementing the desired functions of the various embodiments of the medication on demand described herein, especially the embodiments of the medication on demand devices 200 (FIG. 11) and 400 (FIG. 14). Certain described control functions may not be implemented in all described embodiments.

In one embodiment, the functionality of the controller 700 is implemented by a data processing device (e.g., a microprocessor) operative with a memory 701 for storing and executing the commands required to implement the desired functionality. In such an embodiment the commands and control features are executed by a software program stored in the memory 701. When implemented in a microprocessor, program code configures the microprocessor to create logical, arithmetic and control operations to implement the desired functions. The program code and the microprocessor become an apparatus for practicing the invention.

The memory 701 stores programming code and data (e.g., dosing interval, patient identification information) for use in executing certain functions of the medication on demand device, including dose dispensing times. Stored dosing information can be read from the memory 701 for entry into a patient's medical record via a serial port or directly via a communications device as described below.

The controller 700 comprises an access control function 702 responsive to a reader 704, further comprising a bar code reader, an RFID reader, a smart card reader, a biometrics reader (e.g., finger print, iris) and/or another device for authenticating a person as an authorized patient or as an authorized attendant to program or control the medication on demand device. In an embodiment employing the RFID reader 100 of FIGS. 4, 12 and 13, a patient' RFID tag 102 (see FIG. 8) typically worn on the patient's wrist is scanned within a few inches of the RFID reader 100 for about seven seconds. During the scan, the RFID reader 100 interrogates the RFID tag 102 and in response the tag transmits a response signal to the reader 100. An attendant's RFID tag is similarly scanned to authenticate the attendant to program or query the device or insert a new carousel 418. To enable the scanning party to locate the RFID reader 100 in a dark room, an illuminating device (not shown in the Figures) is disposed proximate the RFID reader 100. In one embodiment, one of the illuminating elements 434/436 provides illumination for the scanning process.

A motor control function 708 controls the motor 44 as described above. The emitter/sensor assembly 408 supplies a control signal to the motor control function 708 to stop motor rotation when the medication retention area 154 is aligned with the dose access opening (such as the opening 430A in the cover 430).

In one embodiment, a stop switch 710 determines that the medication tray has stopped rotating and provides a representative signal to a lock control function 712 that in turn controls the locking mechanism 600 to an engaged condition.

A configuration interface 720 interfaces with the programming platform 722, such as a laptop/tablet computer/PDA (or any of the other programming techniques and apparatuses described herein or generally known) via a serial port 721 to program the various programmable features of the controller 700. The serial port 721 implements a wired, wireless, infrared or any other known communications technique. In alternative embodiments, other port configurations are used in lieu of the serial port 721.

A timer control function 728 supplies timing signals to control the various time-dependent components of the medication on demand device.

An enunciator control function 734 controls a display 736 (such as the display 460 of FIGS. 12 and 13) to display clock time, the time remaining (decrementing) until the next dose is permitted, i.e., accessible through the access opening and/or the time remaining until the dose retention area 154 holding a dose 66 is rotated from beneath the access opening, the device then in an "off" or closed configuration. The display resets to begin the countdown interval at the beginning of each dosing interval. When the display count reaches zero, one of the illuminating elements 434/436 is lit to indicate that the next dose is permitted. The patient swipes the RFID tag proximate the RFID reader and activates the control element 462 to rotate the carousel and present a medication dosage through the access opening.

The enunciator control function 734 also controls a buzzer/beeper 738 or another device capable of providing an aural notification when the next dose is permitted. The annunciator control function 734 also controls a visual notification device 736, such as a flashing or solid light (such as the illuminating elements 434/436) to provide a visual notification when the next dose is permitted.

In another embodiment, the annunciator control function controls an aural or visual indicating device to indicate that a patient or an attendant has been authenticated to use (e.g., program or query) the device or that the authentication attempt has succeeded or failed. In yet another embodiment, the annunciator control function controls an aural or visual indicating device to indicate that an attendant's attempt to override the minimum dosing interval to access a dose for immediate administration has succeeded or failed. A device inoperative condition can also be indicated by an aural or visual indicating device.

Power is supplied to the device via a power supply 740, comprising batteries (such as the batteries 76 illustrated in FIGS. 3 and 14; in one embodiment the batteries comprise nickel-metal-hydride cells. Other power sources, including alternating current (rectified as required) and solar power can be used in lieu of the power supply 740. A low battery sensor operative with the power source 740 provides an indicating signal to the annunciator control function 734 for generating an aural or visual alert when the battery charge has fallen below a predetermined threshold, at which time the batteries can be charged according to known practices. In a preferred embodiment the device comprises a back-up battery power supply 741 to retain programming code and data in the memory 701. The batteries are accessed through a battery door 472 illustrated in FIG. 14.

The controller 700 further comprises a printer driver 748 for supplying print commands to a printer (such as a thermal printer) physically attached to or enclosed within the device. In another embodiment the printer driver 748 drives a separate printer spaced apart from the device and in communications with the medication on demand device over a wired, wireless or infrared link. In another embodiment the printer operates in conjunction with the programming platform 722 to print information regarding operation of the medication on demand device, in response to a query. For example, dosing times and related information (stored in the memory 701) can be printed to the printer for inclusion in the patient's medical record. The attendant can also activate the printer to print a record by operation of one or more of the switches 434/436 or the programming platform (after the attendant is properly authenticated).

In one embodiment, the controller 700 comprises a modem 752 (wired or wireless) for permitting bidirectional communications between the controller 700 of the medicine on demand device and an external communications device interfacing with a data processor, the latter for programming, querying or otherwise controlling the medication on demand device.

In one embodiment, the controller 700 further comprises an expansion card slot 754 for receiving an expansion printed circuit card operative with the controller 700 to reprogram the controller or add features to the medication on demand device of the present invention.

A switch 756 represents the various patient and attendant activated switches described above in conjunction with various embodiments of the present invention. Activation of the switch 756 indicates that an RFID device (e.g., wrist band or smart card) is ready for interrogation for patient authentication or to energize a backlight associated with the display 460. Additionally, in one embodiment the switch 756, when activated by the attendant or patient, supplies a signal to the controller 700 indicating that the accessible medication dose has been administered.

A dose presence detector 757 detects whether the dose has been removed from the retention area 154, for example by detecting the absence of the dose weight from the retention area 154 or using an infrared emitter in the retention area 154 projecting an infrared beam to a spaced apart detector, the beam detected only when a dose is not present in the well. In another embodiment, a patient's finger inserted into the retention area 154 breaks the beam, thereby signaling removal of the medication dose. In still another embodiment, a magnetic field is created within each retention area 154. The existence of the dose in the retention area or insertion of a finger into the retention area distorts the magnetic field. Detection of the distorted magnetic field indicates that the dose has been removed.

As known by those skilled in the art, the various functional attributes of the controller 700 illustrated in FIG. 24 are in communication with other components thereof to effectuate control of the features and functions of the medication on demand device. In one embodiment of the medication on demand device 400, the various components of the controller 700 are disposed on a board 770 as illustrated in FIG. 14.

The medication on demand device further comprises certain override features. In particular, the patient's attendant can override the minimum dosing interval, permitting dose administration prior to expiration of the minimum dosing interval. At anytime during the dosing interval, the attendant activates the override feature by activating the control element 462 and causing it to remain in a certain state for a predetermined interval (five seconds in one embodiment). In response, one of the illuminating elements 434/436 illuminates to indicate override operation. The attendant executes an authentication process, and once authenticated, can either activate the solenoid 606 to permit removal of the cover 430 (and replacement of the carousel 418) or can cause the carousel 418 to rotate, permitting administration of the next medication dose. The attendant can also command the medication on demand device (i.e., manually command without use of the programming platform) to supply a record of the patient's actual dosing regimen.

The various embodiments of the medication on demand device of the present invention comprise communications components providing communications capabilities to external devices (e.g., the programming platform 722, a printer, an information technology backbone) for programming and/or querying the medication on demand device. Certain of these features have been broadly described above. These external devices communicate with the medication on demand device via the modem 752, the serial port 721 and/or any wireless communications protocol (such as a Bluetooth communications protocol) or an infrared communications link.

According to another embodiment, the medication on demand device comprises one element of a telemedicine system that controls the dispensing, billing, and inventory control of medication delivery devices, such as the medication on demand device of the present invention. For example, with the modem 752 connected through a communications link to a control/programming station, the medication on demand the device can be programmed to dial a specified number at predetermined times to report status items. The report can include the number of doses self-administered and the number of doses remaining in the carousel. The medication on demand device can also be queried through its communications devices from a remote site (e.g., a hospital pharmacy, a medication cart, or a nurses' station) and commanded to report status items.

In another embodiment, the medication on demand device is assigned to patients in a drug abuse clinic, permitting drug treatments, such as methadone, to be administered at home. The medication on demand device can include a global positioning system receiver for locating and tracking the device. Further, the device comprises an asset identification indicia (tag) that can be transmitted to a receiving site for tracking the device. The location information is provided to a monitoring station either in response to a location query or on a predetermined schedule.

In another embodiment, the controller 700 includes radio frequency communications equipment providing a wireless link between the medication on demand device and a receiving unit. In one example, the receiving unit resides in a pharmacy cart used by nurses to dispense medications to hospital patients. The transceiver equipment on the cart can query the dispense log from the medication on demand device. The dispense log can be provided from the cart to the pharmacy. In another embodiment, the medication on demand device communicates bi-directionally directly with the pharmacy. Additionally, the dispense log is provided to the hospital accounting department for billing the patient and added to the patient's medical record.

In yet another embodiment, the medication on demand device of the present invention includes a passive radio frequency identification component that disables the medication on demand device when it is removed from a hospital. Hospital doorway sensors detect the presence of the passive RFID element and in response disable the medication on demand device.

When equipped with the proper communications components, a medication on demand device of the present invention communicates over a hospital local area network (either a wired or wireless local area network). The medication on demand device can be programmed and/or queried to provide the dispense log and other information stored within or collected by the medication on demand device.

In the local area network application, several medication on demand devices are likely connected to the network. It is therefore necessary to provide each device with a unique identification that allows contact of the correct device for programming and querying.

The modem also provides a communications link to an automated drug dispensing and inventory control system. As described above, the controller 700 can produce a tray-empty signal responsive to determined tray rotations and the number of medication retention areas 154 carrying a medication dose 66. The controller operative with the modem 752 sends the tray-empty signal to the automated drug dispensing system to advise the pharmacist to prepare a medication carousel to replace the empty carousel.

With the growth of telemedicine systems, the controller 700 operative with the modem 752 (or another communications interface device) allows the medicine on demand device of the present invention to operate in a telemedicine system.

According to another embodiment of the invention, each of the medication retention areas 154 comprises a light source 800 (see FIG. 15) to illuminate the area 154 and the dose 66 to allow the patient to see the dose in a dark room. Such a light source preferably operates at a relatively low temperature to avoid heating of the dose 66. Further, in such an embodiment the medication on demand device comprises a light sensor to detect ambient light and disable the light source 800 during such periods. The light source can also be controlled to activate only shortly prior to the time of a dose administration.

Figure 25:
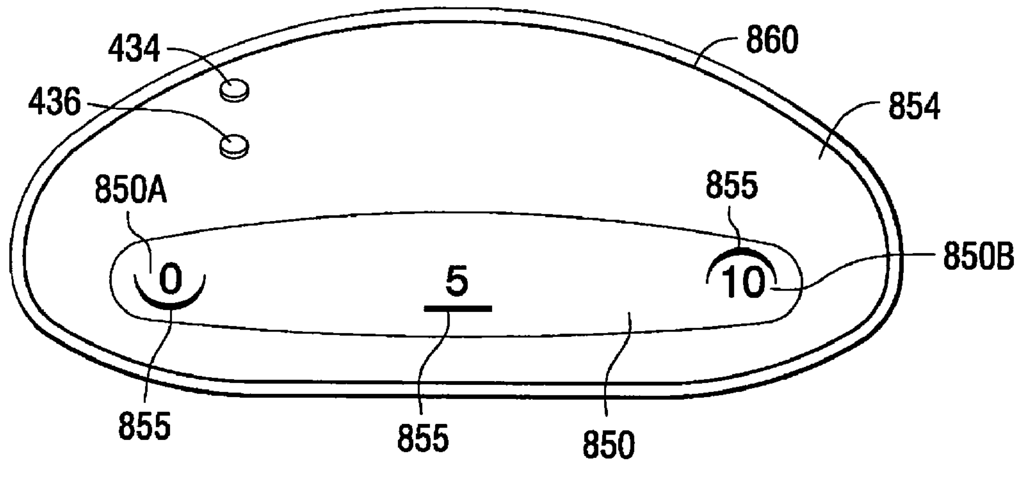
FIG. 25 illustrates an alternative activation element for the medication on demand device of the present invention.

FIG. 25 illustrates an alternative embodiment for the control element 462 of FIG. 14, comprising a plurality of control elements 850 (a plurality of membrane switches in one embodiment) spaced linearly across a region 854 on a front surface of the medication on demand device. The control elements 850 provide the patient with a mechanism for indicating pain severity, ranging from no pain, by activating a control element 850A, to a highest or most severe pain level, by activating the control element 850B. Additional control elements (not shown) between the control elements 850A and 850B allow the patient to indicate intermediate pain levels. A numeral "5" indicates the approximate midpoint of the pain scale between the control elements 850A and 850B. The functionality of the control elements 850 includes the functions associated with the control element 462, i.e., the patient or attendant activates one of the control elements 850 after the dosing interval has elapsed and then presents indicia for authentication. Thus the control elements 850 provide a pain severity indication while controlling operation of the medication on demand device.

In one embodiment, an eleven element pain scale is implemented by the control elements 850, comprising: a zero level (represented by the control element 850A), levels 1-3 indicating mild pain, levels 4-6 indicating moderate pain and levels 7-10 indicating severe pain (with the control element 850B representing a most severe pain). To assist the patient in determining his pain level, expressive facial or smile icons 855 are disposed within the region 854, overlying the control elements 850 in one embodiment.

In an alternative embodiment, each of the control elements 850 comprises a sensor each producing a proximate magnetic field. Disturbance of the magnetic field by, for example, a finger inserted into the field, is detected and represents activation of the corresponding control element 850.

In the embodiments described above the RFID reader 100 comprises an integrated antenna and reader/processor that tends to limit the read distance to about one inch. In another embodiment of the invention, an external RFID antenna 860 (see FIG. 25) is disposed about a periphery of the region 854. The antenna 860, which is coupled to the RFID reader/processor (not shown), extends the read range to several inches.

In another embodiment of the invention, when an attendant is responsible for providing medication to the patient, rotation of the carousel or tray is responsive to authentication of both the patient and the attendant. In an application where the patient self-administers the medication dose, the medication on demand device requires authentication by only the patient to cause the carousel or tray to present the next dose.

In yet another embodiment, in addition to the authentication process required to activate (rotate) the carousel or tray as described above, the patient is required to perform an overt act to indicate that the medication has been administered. Administration of the dose and the administration time can be recorded by the medication on demand device for later entry into the patient's record. Such an overt act can comprise a subsequent authentication-like process or simple activation of a switch as a condition precedent to presentation of the next dose.

Figure 26:
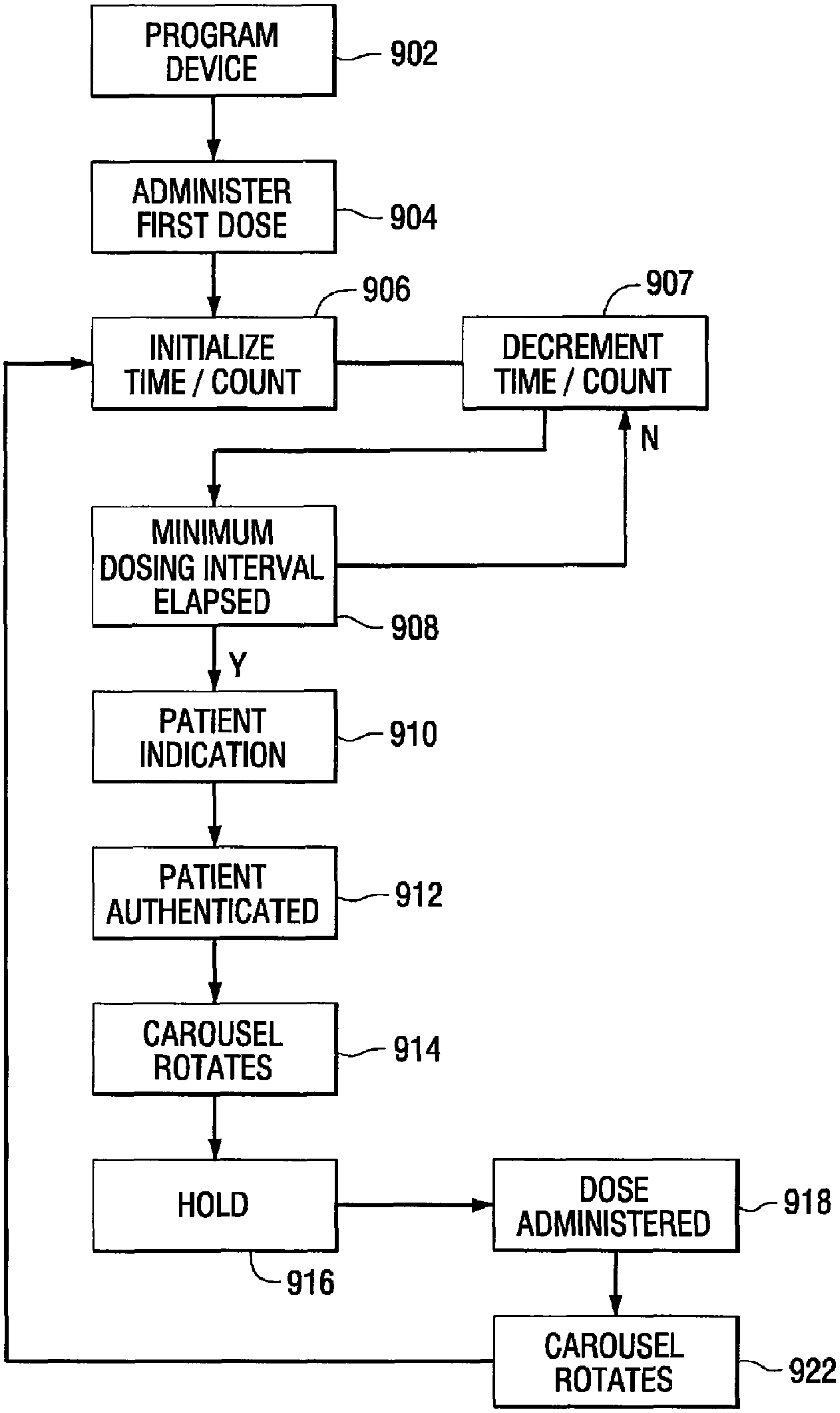
FIG. 26 is a flow chart illustrating operation of one embodiment of the medication on demand device of the present invention.

FIG. 26 illustrates a flow chart depicting operations associated with the medication on demand device of the present invention. At a step 902, an attendant programs the various programmable features of the medication on demand device. In one embodiment, the programing elements include: a minimum dosing interval, medication type, patient identification information, attendant identification and a first dose cock time or an interval between a present time and administration of the first dose.

A step 904 depicts administration of the patient's first medication dose at the predetermined clock time or after an interval from the present time.

At a step 906 a counter or timer is initialized with the minimum dosing interval in preparation for the next dose after the minimum dosing interval. At a step 907 the counter or timer is decremented and a decision step 908 determines whether the minimum dosing interval has elapsed. Execution returns to the decrementing step 907 until the decision turns affirmative at the decision step 908. Execution continues to a step 910 where the medication on demand device provides a visual and/or aural indication to the patient.

The patient is authenticated, according to the various authentication techniques described elsewhere herein, at a step 912. (In one embodiment, authentication is preceded or followed by activation of a control element of the medication on demand device.) The carousel rotates at a step 914 and holds in the rotated position during a step 916 (about 30 seconds in one embodiment). The rotated position aligns a medication dose with the opening, allowing the patient to withdraw a dose from the carousel through the opening. Step 918 indicates that the patient has self-administered the dose. After the hold time has expired, the carousel rotates (see a step 922) to align a blank region between medication retention areas with the opening. In this configuration, a medication dose is not available for administration. The process returns to the step 906 where the counting or timing to the next dosage interval begins.

In another embodiment, the dispenser comprises a plurality of medication retention areas 154 and a cover or housing having a plurality of controlled access openings formed therein. For example, the controlled access openings comprise a plurality of doors prohibiting access to the retention areas 154 when in a closed condition and permitting access to the medication retention areas 154 when in an opened condition. A controller controls a condition of the plurality of doors to permit access to the medication doses after the minimum dosing interval.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments as set forth herein. In addition, modifications may be made to adapt the teachings of the present invention to a particular application without departing from its essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A medication dispenser for permitting access to medication doses by a patient only after a minimum dosing interval between consecutive doses, the medication dispenser comprising:

- a medication tray comprising medication retention areas, wherein prior to dispensing any medication doses, medication retention areas carrying a medication dose alternate with empty medication retention areas;
- a cover disposed over the medication tray, the cover defining a dose opening therein through which a dose in a retention area can be accessed when the dose opening is aligned with a medication retention area carrying a medication dose;
- an indicator for indicating when the minimum dosing interval has elapsed;
- an authenticating element responsive to patient identification information for authenticating the patient to access a medication dose, the authenticating element operable to authenticate the patient only after the minimum dosing interval has elapsed; and
- a controller for aligning the dose opening and a retention area carrying a medication dose to present a medication dose through the dose opening after the patient has been authenticated, the medication dose available through the dose opening for a predetermined time, after the predetermined time the controller for moving the medication tray to align the dose opening with an empty retention area;
- wherein responsive to a failed patient authentication attempt or lack of an authentication attempt, the controller does not rotate the tray to align the dose opening with a retention area carrying a medication dose.

2. The medication dispenser of claim 1 further comprising a housing defining a tray opening therein, the medication tray received within the tray opening, wherein the cover is affixed to lockably close the tray opening, and wherein in an unlocked condition the cover is removable from the tray opening to provide access to the tray.

3. The medication dispenser of claim 2 wherein the medication tray comprises a circularly shaped medication tray with the medication retention areas disposed in a radial pattern within the medication tray, and wherein the tray opening comprises a circularly shaped tray opening.

4. The medication dispenser of claim 1 further comprising a position detector cooperating with spaced-apart indexing members coupled to the medication tray to determine a position of a medication retention area carrying a medication dose or an empty medication retention area relative to the dose opening.

5. The medication dispenser of claim 4 wherein the position detector comprises an emitter and sensor operatively coupled for detecting the indexing members.

6. The medication dispenser of claim 1 further comprising a motor, the controller controlling the motor to align the dose opening with a retention area carrying a medication dose or to align the dose opening with an empty medication retention area.

7. The medication dispenser of claim 1 further comprising a housing defining a circular tray opening therein and a motor, the medication tray further comprising a circular medication tray received within the tray opening with the medication retention areas disposed in a radial pattern within the medication tray, the motor to align the dose opening with a medication retention area carrying a medication dose or to align the dose opening with an empty medication retention area.

8. The medication dispenser of claim 1 wherein the minimum dosing interval is measured from an immediately previous presentation of one of the retention areas carrying a medication dose at the dose opening, from an immediately previous presentation of an empty retention area at the dose opening, from an immediately previous authentication of the patient or after the predetermined time has elapsed.

9. The medication dispenser of claim 1 wherein the controller comprises a memory element for storing patient identification information, the authenticating element for authenticating the patient by comparing stored patient identification information with identification indicia provided by the patient.

10. The medication dispenser of claim 9 further comprising a keypad, a bar code reader, an RFID reader, a fingerprint reader, a voice print reader or a smart card reader, wherein the identification indicia provided by the patient comprises a corresponding keypad code entry, a bar code, an RFID tag, a fingerprint, a voice print or a smart card.

11. The medication dispenser of claim 10 wherein the bar code or the RFID tag is disposed on a wristband worn by the patient.

12. The medication dispenser of claim 1 further comprising a clock controllable by the controller for displaying time remaining until the minimum dosing interval has expired or comprising a visual or aural indicator controllable by the controller, wherein a first condition of the visual or aural indicator denotes the minimum dosing interval has not elapsed and a second condition denotes that the minimum dosing interval has elapsed.

13. The medication dispenser of claim 1 further comprising a configuration interface for receiving minimum dosing interval information or for receiving patent authentication information.

14. The medication dispenser of claim 13 wherein the configuration interface is responsive to a command provided to the controller by an authenticated person to control the medication tray to present one of the medication retention areas carrying a medication dose through the dose opening prior to lapsing of the minimum dosing interval, wherein the authenticated person excludes the authenticate patient.

15. The medication dispenser of claim 1 wherein an authenticated person can control, program or query the medication dispenser, wherein the authenticated person excludes the authenticated patient.

16. The medication dispenser of claim 1 wherein a material of the cover comprises a translucent or transparent material to permit visual inspection of medication doses within the medication retention areas.

17. The medication dispenser of claim 1 further comprising a solenoid for releasably securing the cover to a housing supporting the medication tray, wherein a first state of the solenoid locks the cover to the housing and a second state of the solenoid permits removal of the cover from the housing to access the medication tray, the housing further comprising openings in an upper region thereof, each opening for receiving a tab extending from the cover, wherein after each tab is received within an opening the cover is rotated for displacing each tab within the opening, and wherein after rotation the cover is locked to the housing by interaction of a pin controlled by the solenoid and one of the tabs.

18. The medication dispenser of claim 1 further comprising a communications interface for communicating information between the medication dispenser and a remote communications device.

19. The medication dispenser of claim 18 wherein information supplied from the remote communications device to the medication dispenser comprises the minimum dosing interval or person authentication information, and wherein information supplied from the medication dispenser to the remote communications device comprises information related to presentation of a medication retention area carrying a medication dose through the dose opening, and wherein certain of the information supplied from the medication dispenser is recorded in a patient medical record.

20. The medication dispenser of claim 19 wherein the information related to presentation of medication retention areas carrying a medication dose comprises a time of day when each medication retention area carrying a medication dose was presented through the dose opening and a number of times in a 24 hour period when a medication retention area carrying a medication dose was presented through the dose opening.

21. The medication dispenser of claim 1 further comprising a plurality of pain-severity indicating control elements, and wherein responsive to patient activation of one of the plurality of pain-severity indicating control elements according to the severity of pain experienced by the patient and responsive to authentication of the patient after the minimum dosing interval has elapsed, the controller aligns the dose opening and a medication retention area carrying a medication dose, and wherein the plurality of pain-severity indicating control elements comprises a first control element for indicating no pain, a second control element for indicating most severe pain, and a plurality of intermediate control elements for indicating a pain severity between no pain and the most severe pain.

22. The medication dispenser of claim 21 wherein each one of the plurality of pain-severity indicating control elements further comprises a pain-severity indicating icon associated therewith.

23. The medication dispenser of claim 1 further comprising a stepper motor and mating gears, the stepper motor for driving a first of the mating gears, responsive to the controller, for driving a last of the mating gears for stepping the tray through successive positions until the tray presents one of retention areas carrying a medication dose or one of the empty medication retention areas through the dose opening.

24. The medication dispenser of claim 1 further comprising a motor responsive to the controller and a plurality of gears, the motor for rotating a first gear of the plurality of gears for rotating a last gear of the plurality of gears cooperating with the tray for moving the tray to present one of the retention areas carrying a medication dose through the dose opening, wherein the plurality of gears resist movement of the tray in a direction opposite to a direction in which the motor moves the tray.

25. The medication dispenser of claim 1 responsive to a remote computing device via a wired or wireless network for providing dosing information to the medication dispenser.

26. The medication dispenser of claim 25 wherein the remote computing device is associated with one or more of a central pharmacy, a medication cart and a nurse's station.

27. The medication dispenser of claim 25 wherein the remote computing device queries the medication dispenser to determine information related to the presentation of retention areas through the dose opening.

28. The medication dispenser of claim 1 further comprising a sensor for determining presence of a medication dose in any retention area.

* * * * *